US008417990B2

(12) United States Patent
Ohkawa

(10) Patent No.: US 8,417,990 B2
(45) Date of Patent: Apr. 9, 2013

(54) MULTI-CORE PROCESSING SYSTEM FOR VEHICLE CONTROL OR AN INTERNAL COMBUSTION ENGINE CONTROLLER

(75) Inventor: Keiichiro Ohkawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 257 days.

(21) Appl. No.: 12/625,266

(22) Filed: Nov. 24, 2009

(65) Prior Publication Data

US 2010/0138693 A1 Jun. 3, 2010

(30) Foreign Application Priority Data

Nov. 28, 2008 (JP) .................................. 2008-303369

(51) Int. Cl.
*G06F 11/00* (2006.01)
(52) U.S. Cl.
USPC ................................................ 714/10; 700/79
(58) Field of Classification Search .................. None
See application file for complete search history.

(56) References Cited

U.S. PATENT DOCUMENTS

| 5,012,409 | A * | 4/1991 | Fletcher et al. | 718/103 |
| 5,469,447 | A * | 11/1995 | Brunemann et al. | 714/797 |
| 5,845,060 | A * | 12/1998 | Vrba et al. | 714/12 |
| 2002/0139359 | A1 * | 10/2002 | West | 123/690 |
| 2002/0152418 | A1 * | 10/2002 | Griffin et al. | 714/11 |
| 2004/0025078 | A1 * | 2/2004 | Nagano et al. | 714/11 |
| 2006/0190702 | A1 | 8/2006 | Harter et al. | |
| 2006/0195849 | A1 * | 8/2006 | Peleska et al. | 719/318 |
| 2006/0212677 | A1 | 9/2006 | Fossum | |
| 2007/0255875 | A1 | 11/2007 | Weiberle et al. | |
| 2007/0294559 | A1 | 12/2007 | Kottke | |

FOREIGN PATENT DOCUMENTS

| JP | 3-15946 A | 1/1991 |
| JP | 3-196232 A | 8/1991 |
| JP | 6-332874 A | 12/1994 |
| JP | 9-16535 A | 1/1997 |
| JP | 2006-260568 A | 9/2006 |
| JP | 2008-10959 A | 1/2008 |
| JP | 2008-518296 A | 5/2008 |

OTHER PUBLICATIONS

Corresponding European Search Report dated Mar. 22, 2010 (Nine (9) pages).
Japanese Office Action including English language translation dated Nov. 9, 2010 (Ten (10) pages).

* cited by examiner

*Primary Examiner* — Gabriel Chu
(74) *Attorney, Agent, or Firm* — Crowell & Moring LLP

(57) ABSTRACT

A vehicle control system for controlling a device mounted on a vehicle includes a plurality of processor cores, and a computation process unit that is required for the control of the device is executed on the plurality of cores. A core failure determination unit compares a result of a computation process executed by the computation process unit at a particular timing on a particular one of the plurality of cores, with a result of a computation process executed at a timing different from the particular timing on another core different from the particular core, to determine that a failure has occurred on the specific core.

19 Claims, 25 Drawing Sheets

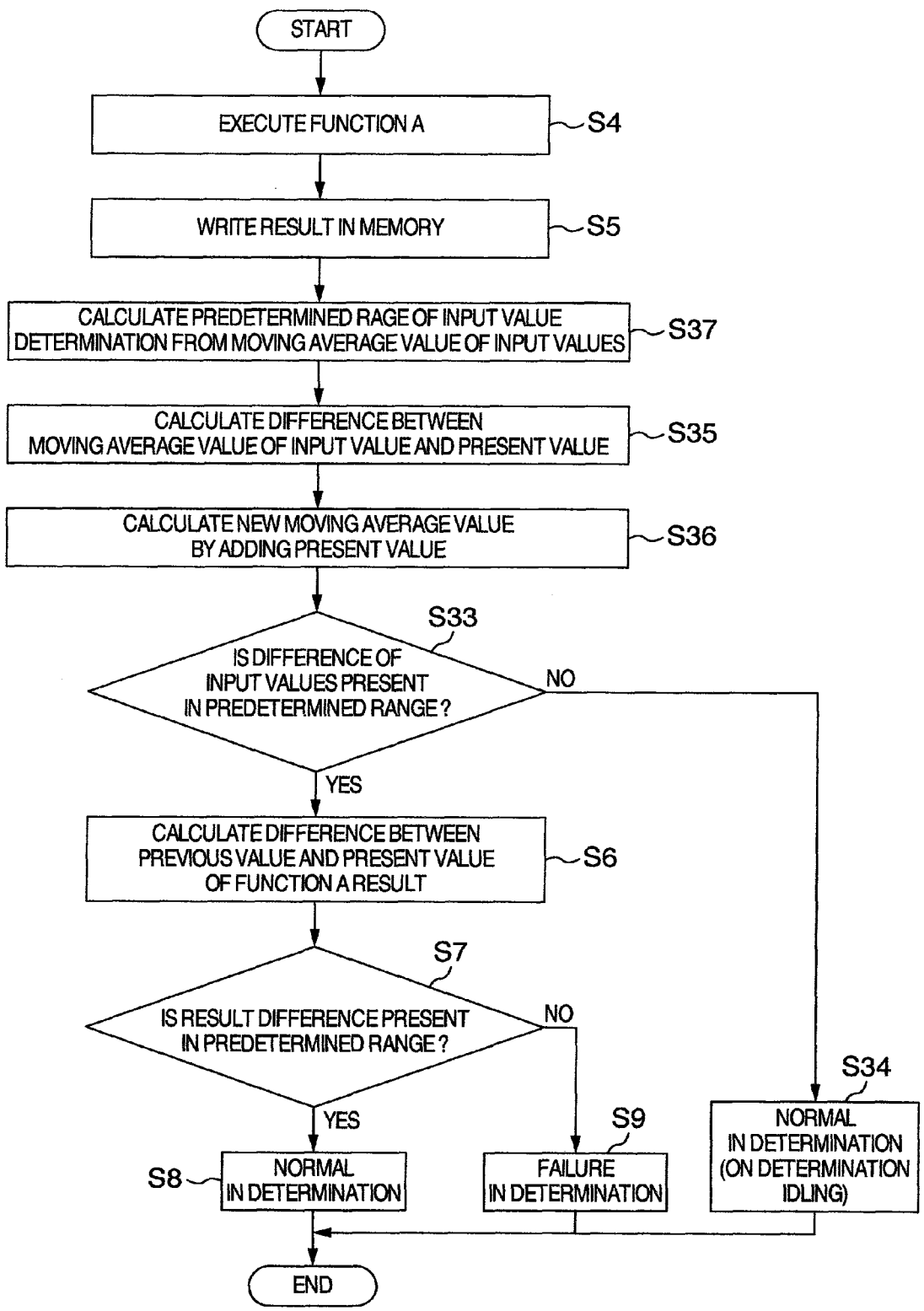

MULTI-CORE PROCESSING SYSTEM FOR VEHICLE CONTROL OR AN INTERNAL COMBUSTION ENGINE CONTROLLER

BACKGROUND OF THE INVENTION

The present invention relates to a built-in control device for controlling a device on a vehicle, and in particularly to a failure diagnosis for a multi-core CPU (Central Processing Unit) system having a plurality of CPUs.

For the purpose of improving reliability and processing speed of the control device, in many instances recently the CPU in a control computer has been provided with a plurality of processors, and a multi-core CPU configured by a plurality of CPUs. In the above-mentioned computer, when a processor or core has failed, it is necessary to detect immediately its failure, halt the processor or core, and apply a process to prevent an adverse affect on the control.

For example, in a known redundant system disclosed in JP-A-3-15946, data output from a plurality of redundancy subsystems are compared with each other to then select an output, the data of which are consistent, from the highest reliable subsystem. JP-A-9-16535 also discloses a system in which plural outputs are compared with each other in a decision by majority to determine a conclusive output.

JP-A-3-196232 discloses a method of diagnosing a plurality of CPU cores while executing a normal computation process, without using a special diagnostic program and data. JP-A-6-332874 discloses a system for starting to execute a test program on respective processors to detect a hardware failure.

SUMMARY OF THE INVENTION

As described above, the system in which the data are compared for consistency is used to improve reliability. That is, it is assumed that the system executes the same processes on the plurality of processors or cores to build up the redundant system by using its processed result. The failure diagnosis method proposed by the JP-A-3-196232 has the problem that CPU resource consumption is increased, since the normal computation process is executed respectively on the plurality of CPUs or cores in order to compare the processed results. To further improving processing speed in the above-mentioned systems, it is necessary to increase the number of processors or cores, which increases cost and mounting capacity. In the case of a vehicle control apparatus, it is difficult to apply the above-mentioned systems from the standpoint of cost performance and mountability. In relation to the above-mentioned problems, JP-A-6-332874 has proposed a system in which a test program for use in the failure diagnosis is started on the respective processors, executing a distributed process. However, since this test program is used for a computation process that differs from a normally executed computation process, there is a problem with regard to computation burden for the respective processors or cores.

An object of the invention is to perform a failure determination for the plurality of cores on the vehicle control apparatus that includes a multi-core CPU system, with compatibility between improvements regarding reliability and processing speed, while limiting redundant computation caused by the special test program etc., and resource consumption of CPU.

According to one aspect of the invention, a multi-core system (that is, a system that has a plurality of cores) for controlling a device mounted on a vehicle includes a computation process unit that is to be executed on the plurality of cores, and is required for the control of the device. A core failure determination unit compares the result of the computation process executed by the computation process unit at a particular timing on a particular one of said plurality of cores, with the result of a computation process executed by the computation process unit at a timing different from the particular timing, on another core different from the particular core (among the plurality of cores) to determine that a failure occurs on the specific core.

According to another aspect of the invention, the core failure determination unit determines that a failure occurs on the particular core, when there is a loss of continuity in the results of the computation process in the computation process unit, due to switching over the core on which the computation process is executed. The core failure determination unit also compares the results of the computation process at a continuous computation cycle. The multi-core vehicle control system includes a difference determination unit that calculates a difference among the results in the computation processes executed by a different core, at a different timing, and determines whether the difference is within a predetermined range. The core failure determination unit determines that the failure occurs on the specific core in accordance with a determination result of the difference determination unit.

According to still another aspect of the invention, the core failure determination unit compares the results of the computation process in a continuous computation cycle.

According to still another aspect of the invention, the multi-core vehicle control system includes a difference determination unit to calculate a difference of the results in the computation processes executed by different cores at a different timing to determine whether the difference is within a predetermined range. The core failure determination unit determines that a failure has occurred on the particular core based on a determination result of the difference determination unit.

According to still another aspect of the invention, the vehicle control multi-core system provides a difference determination unit to calculate a moving average value of the results of at least two computation processes to calculate a difference between the moving average value and the result in the execution of the computation process at the particular timing by the computation process unit and determine whether the difference is within a the predetermined range. It is determined that the failure has occurred on the particular core in accordance with the determination result of the difference determination unit.

According to still another aspect of the invention, the predetermined range for use in the determination in the difference determination unit is calculated in accordance with the moving average value of the execution results of the at least two computation processes.

According to still another aspect of the invention, the core failure determination unit increments a failure counter when the determination result of the particular core in the difference determination unit is not within the predetermined range. It is then determined that a failure has occurred on the particular core when the count in the failure counter exceeds a predetermined number.

According to still another aspect of the invention, the vehicle control multi-core system includes a computation process assignment unit to divide the computation process unit to be assigned to the plurality of cores in such a way that the core on which the computation process is executed at an execution timing is switched over. The computation process assignment unit removes a particular core from an assignment target to reassign the computation process unit when the core failure determination unit determines that a failure has occurred on the particular core.

According to still another aspect of the invention, the core failure determination unit executes on a core that has been identified as normal by the core failure determination unit, in a previous computation cycle.

According to still another aspect of the invention, the difference determination unit executes on the core that has been identified as normal by the core failure determination unit, in the previous computation cycle.

According to still another aspect of the invention, the difference determination unit and the core failure determination unit execute redundantly on at least three or more odd-numbered cores to execute a core failure determination in decision by a majority of the executed results.

According to still another aspect of the invention, the difference determination unit and the core failure determination unit execute redundantly on at least two cores, to weight each of the determination results of such cores and aggregate weighted results, so that the core failure determination is executed by using an aggregated result.

According to still another aspect of the invention, the difference determination unit and the core failure determination unit execute redundantly on the at least three cores. When only one such core determines that a particular core has failed, and the others determine the particular core is normal, it is concluded that the failure occurs on the core which determines the particular core as the failure; and when the only one such core determines the particular core is normal, while the others determine the particular core has failed, it is determined, that the failure occurs on both the core which determines the particular core is normal, and the particular core.

According to still another aspect of the invention, the multi-core vehicle control system includes a drive mode switching-over unit for providing at least two drive modes for the vehicle, and the core failure determination is not executed for a predetermined time period when the drive mode is changed by the drive mode switching-over unit.

According to still another aspect of the invention, the multi-core vehicle control system detects at least one input value for use in the computation process unit, and the core failure determination unit includes an input value difference determination unit that determines whether a difference between the input value at a particular input timing and the input value at an input timing earlier than the particular input timing is within a predetermined range with respect to the one or more input values. The core failure determination is not executed for the predetermined time period when the input value difference determination unit determines that the difference is outside the predetermined range.

According to still another aspect of the invention, the input value difference determination unit calculates the moving average value of the input values obtained from the at least two timings to determine whether a difference between the moving average value of the input values and the input value at the particular input timing is present in the predetermined range.

According to still another aspect of the invention, the predetermined range for use in the determination in the input value difference determination unit is calculated in accordance with the moving average value of the input values.

According to still another aspect of the invention, the timing at which the computation process unit is assigned to the plurality of cores to execute the computation process is determined in synchronism with an operation of the device.

According to still another aspect of the invention, an internal combustion engine controller which has a plurality of cores to control an internal combustion engine, provides a computation process unit that is required for a control of the internal combustion engine and is executed on the plurality of cores. A core failure determination unit compares the result of a computation process executed by the computation process unit at a particular timing on a particular one of the plurality of cores, with a result of a computation process executed by the computation process unit at a timing different from the particular timing on another core different from the particular core among the plurality of cores, to determine that the failure occurs on the specific core.

According to still another aspect of the invention, the core failure determination unit determines that a failure has occurred on the specific core, when there is a loss of continuity of the results of the computation process in the computation process unit due to switching over the core on which the computation process is executed in the computation processing unit. The vehicle control multi-core system provides a computation process assignment unit to divide the computation process unit and assign it to the plurality of cores in such a way that the core on which the computation process is executed at an execution timing is switched over. The computation process assignment unit determines a timing at which the computation process unit is assigned to the plurality of cores, in synchronism with an operation of the internal combustion engine.

According to still another aspect of the invention, the internal combustion engine controller includes a computation process assignment unit to divide the computation process unit to be assigned to the plurality of cores in such a way that the core on which the computation process is executed at an execution timing is switched over. The computation process assignment unit determines a timing at which the computation process unit is assigned to the plurality of cores to execute the computation process in synchronism with an operation of the internal combustion engine controller.

According to the invention, the process is executed simultaneously on the plurality of cores, so that the resource of cores can be used effectively. A special test program is unnecessary, so that the failure diagnosis can be realized for the multi-core system with a computation burden less.

The other objects, features and advantages of the invention will become apparent from the following description of the embodiments of the invention taken in conjunction with the accompanying drawings.

BRIEF DESCRIPTION OF THE DRAWINGS

FIG. 30 is a flowchart showing an operation relative to the failure determination in one cycle of the task on the respective cores in a thirteenth embodiment.

DESCRIPTION OF THE EMBODIMENTS

Hereinafter, embodiments of the invention will be described with reference to the drawings.

First Embodiment

Figure 1:
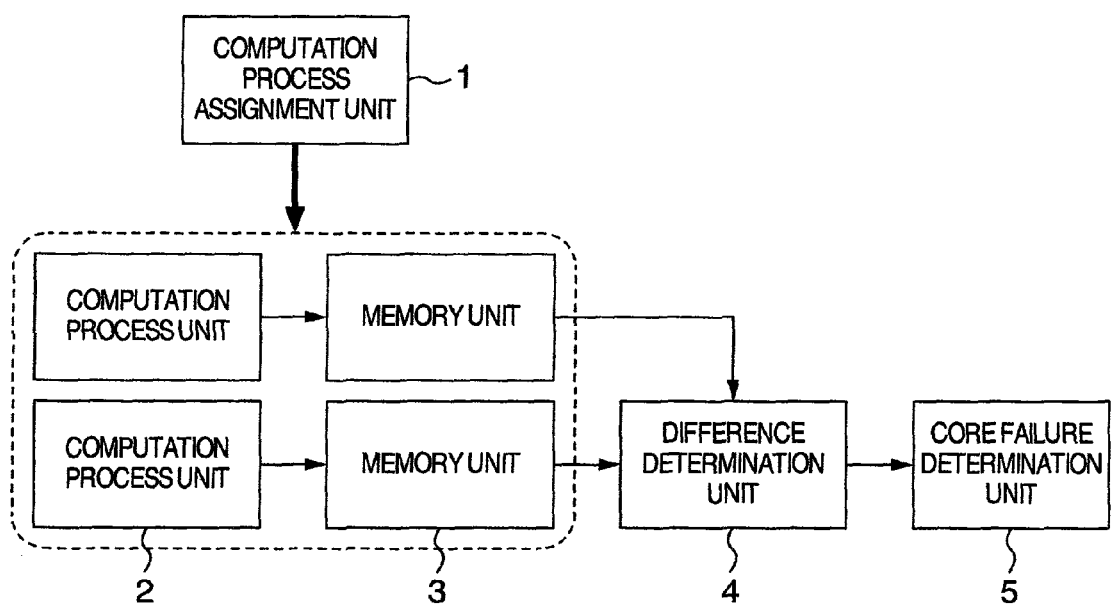
FIG. 1 is a basic configuration diagram of the invention.
Figure 2:
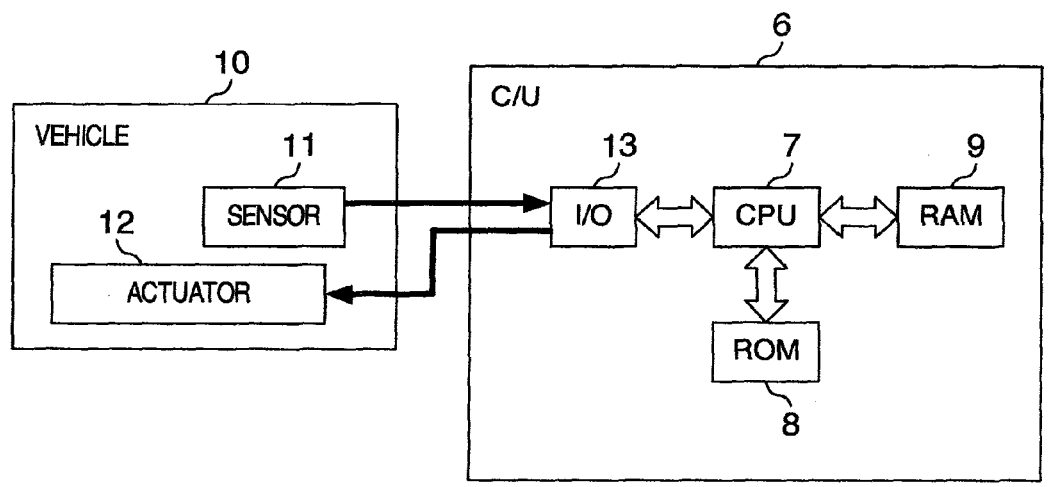
FIG. 2 is an entire configuration diagram showing embodiments in the invention.

A first embodiment of the present invention will be described with reference to the drawings. FIG. 1 is a basic configuration diagram of the invention. As shown in FIG. 1, a vehicle control multi-core system includes a computation process unit 2 for controlling a device mounted on a vehicle, a memory unit 3 for storing a result obtained by the computation process unit 2, a computation process assignment unit 1 for allocating the computation process unit 2 to a different core for each computation period, a difference determination unit 4 for determining whether a difference between the result obtained in the present period and the result in the previous period is present in a predetermined range, and a core failure determination unit 5 for determining that a failure occurs on the core executing the computation process in the present period when the difference determination unit 4 determines that the difference is not within a predetermined range. FIG. 2 is an entire configuration diagram in a first embodiment of the invention. Referring to FIG. 2, a reference numeral 6 denotes a control unit (C/U) with a microcomputer, 7 denotes a microcomputer (CPU), 8 denotes a read-only memory device (ROM), 9 denotes a random access storage memory (RAM), 10 denotes a vehicle, 11 denotes a sensor provided on the vehicle 10, 12 denotes an actuator provided on the vehicle 10, and 13 denotes an input/output device (I/O) for transmitting and receiving a signal of the sensor 11 and actuator 12.

The C/U 6 receives the signal from the sensor 11 and executes a computation by using the received signal and control data stored in the ROM 8 to output a control signal to the actuator 12.

For example, assuming that the C/U 6 is an in-vehicle engine control unit; the vehicle 10 is a gasoline injection type internal combustion engine; the sensor 11 is an air flow sensor and a revolution sensor; and the actuator 12 is a fuel injector, the CPU 7 calculates a fuel injection amount by collating air flow information and revolution information, both obtained from the air flow sensor and revolution sensor through the I/O 13, with control data stored in the ROM 8. The CPU 7 then outputs a signal for controlling a valve open timing of the fuel injector on the basis of the fuel injection amount to the fuel injector through the I/O 13. Such above-mentioned system can be taken as a fuel injection control.

Figure 3:
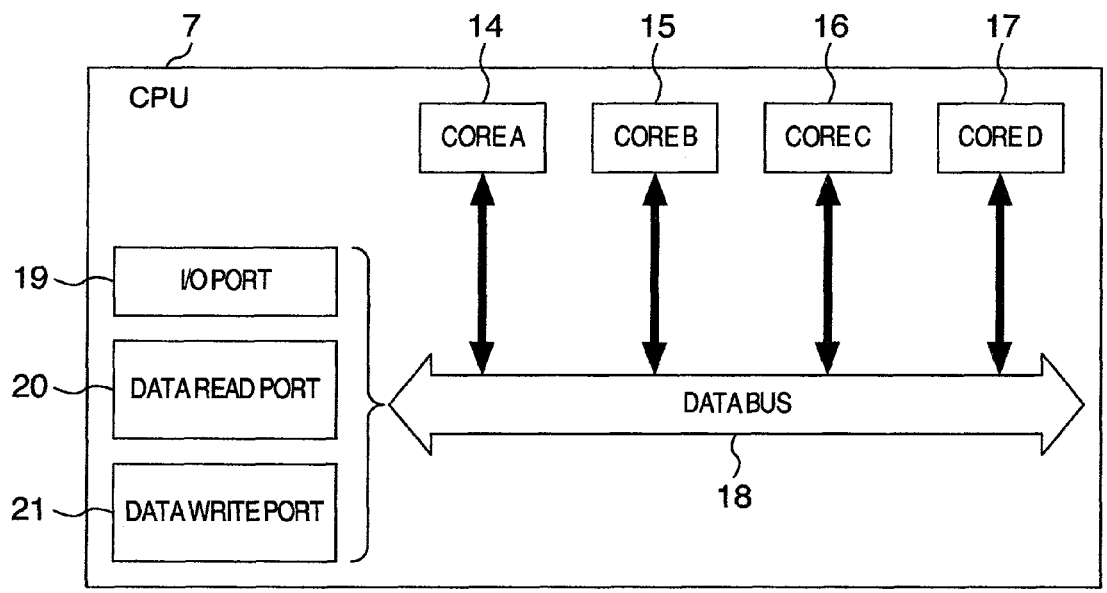
FIG. 3 is a diagram showing an internal configuration of a CPU.

FIG. 3 shows an internal configuration of the CPU 7. The CPU 7 is a multi-core CPU including two or more central computation processing units (core). In FIG. 3, the CPU 7 is configured by four cores A to D (or 14 to 17). Any number of cores may be acceptable if there are two or more, however, the four cores in FIG. 3. The cores A to D (or 14 to 17) are connected respectively to a data bus 18. The data bus 18 is connected with an I/O port 19, a data read port 20 and a data write port 21 to execute a data input and output from/to the externally arranged I/O 13, ROM 8 and RAM 9. In addition, this embodiment takes a system using the multi-core CPU containing the plural cores incorporated in one CPU package. However, a multi-processor system having plural CPU packages may be employed in place of the multi-core CPU. It is not distinguished that the core is specifically different from the processor in the invention.

Figure 4:
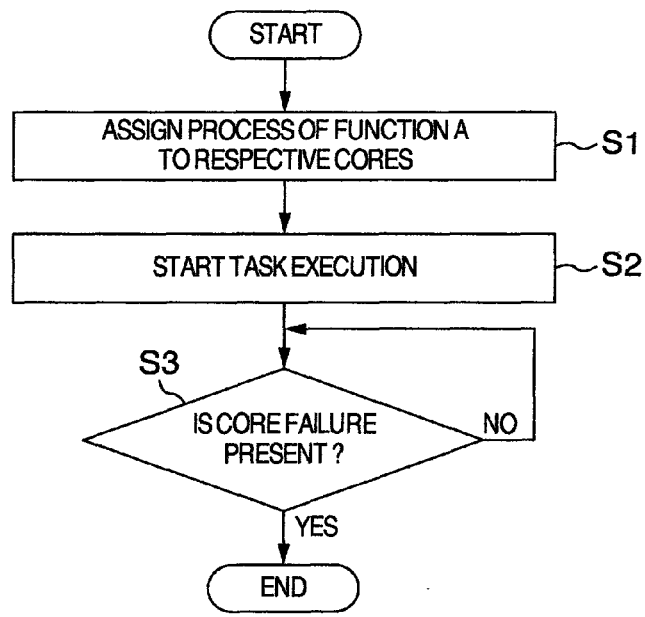
FIG. 4 is a flowchart showing an operation of an operating system (OS)

The following description will be concerned with an operation. FIG. 4 is a flowchart showing an operation of an operating system (OS) in the CPU 7. After started the CPU 7, an assignment process is executed for assigning a process of a function A to respective cores at a step S1. Here, the function A is an example of a computation process unit relative to a vehicle control. Any type of the computation process unit may be acceptable for use in a failure diagnosis in the multi-core system of the invention if a constant continuity can be expected for an output result from that process. For example, a function can be taken as an example for calculating the above-mentioned fuel injection amount. In addition, the continuity in this case will be described later with use of a specific example. Next, an execution of a task containing the process of the function A starts at a step S2. A determination process is executed by using a result of a failure determination determined by the task process at a step S3. If the process determines as a normal (core failure is not present), the process returns again to the step S3 for continuing the task process. If the process determines as a failure (core failure is present), the process terminates.

Figure 5:
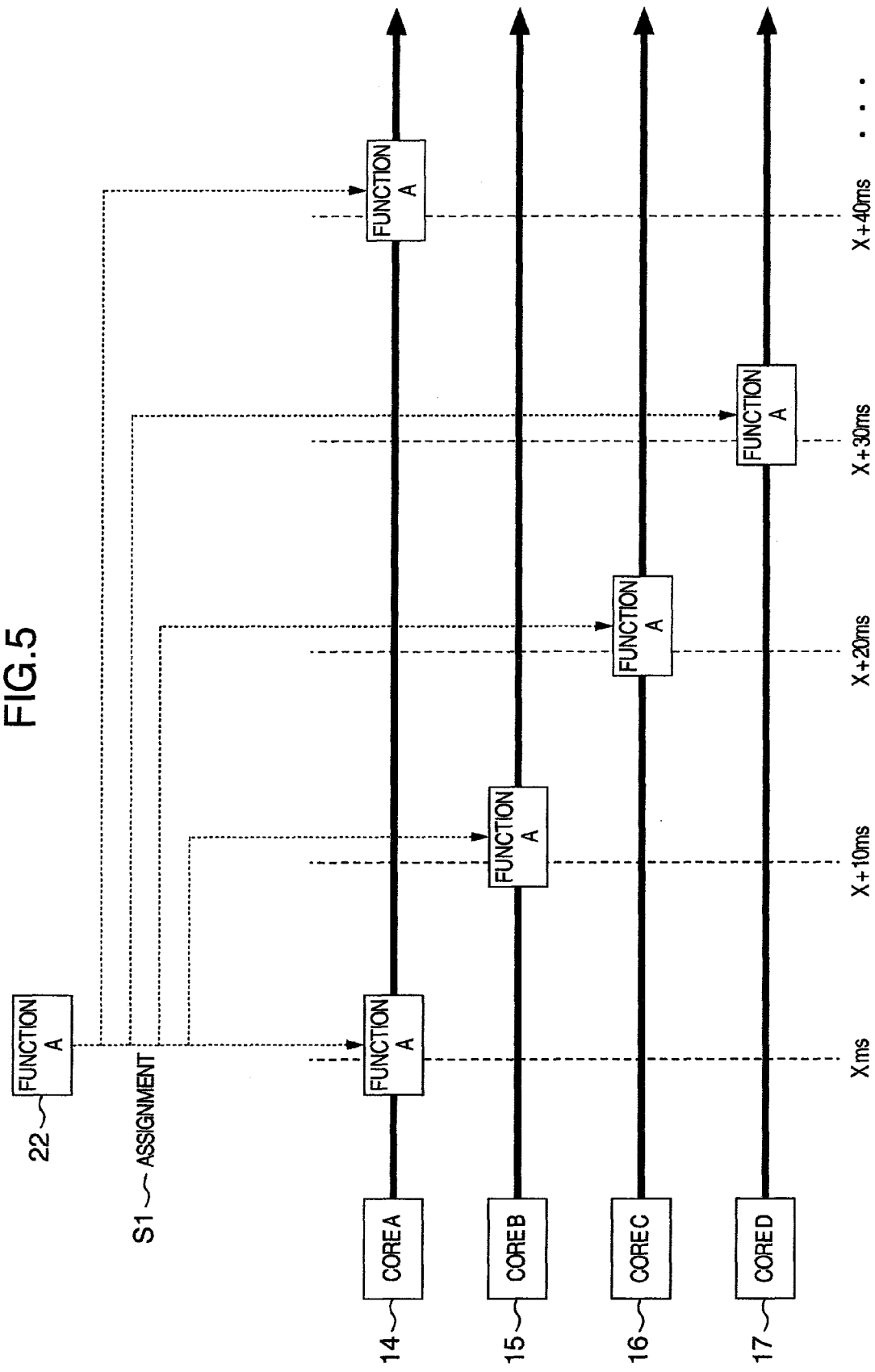
FIG. 5 is a diagram showing a process represented by time axes for an assignment of function A and respective cores.

The assignment process at the step S1 will be described in detail with reference to FIG. 5. FIG. 5 shows respective core processes of the cores A to D (or 14 to 17) represented by time axes. The task is set in a 10 ms cycle as an example, that is, it proceeds at every 10 ms from a time X as an origin point to X ms, X+10 ms, X+20 ms and X+30 ms. A function A 22 is assigned to individual cores in every 10 ms cycle by executing the assignment process at the step S1. As shown in FIG. 5, the function A 22 is assigned respectively to a core A 14 at the task of X ms, assigned to a core B 15 at the task of X+10 ms, assigned to a core C 16 at the task of X+20 ms, and assigned to a core D 17 at the task of X+30 ms. This example shows four cores, however, any number of cores may be acceptable if there are two or more. Further, this example shows that a process timing is set in every 10 ms cycle, however, this cycle interval may be set to any times. For example, the timing of the computation process may be synchronized with an irregular cycle, such as synchronized with an engine revolution. Furthermore, this example shows that the assignment is executed in the order of the cores A to D (or 14 to 17), however, this order is not limited thereto.

Figure 6:
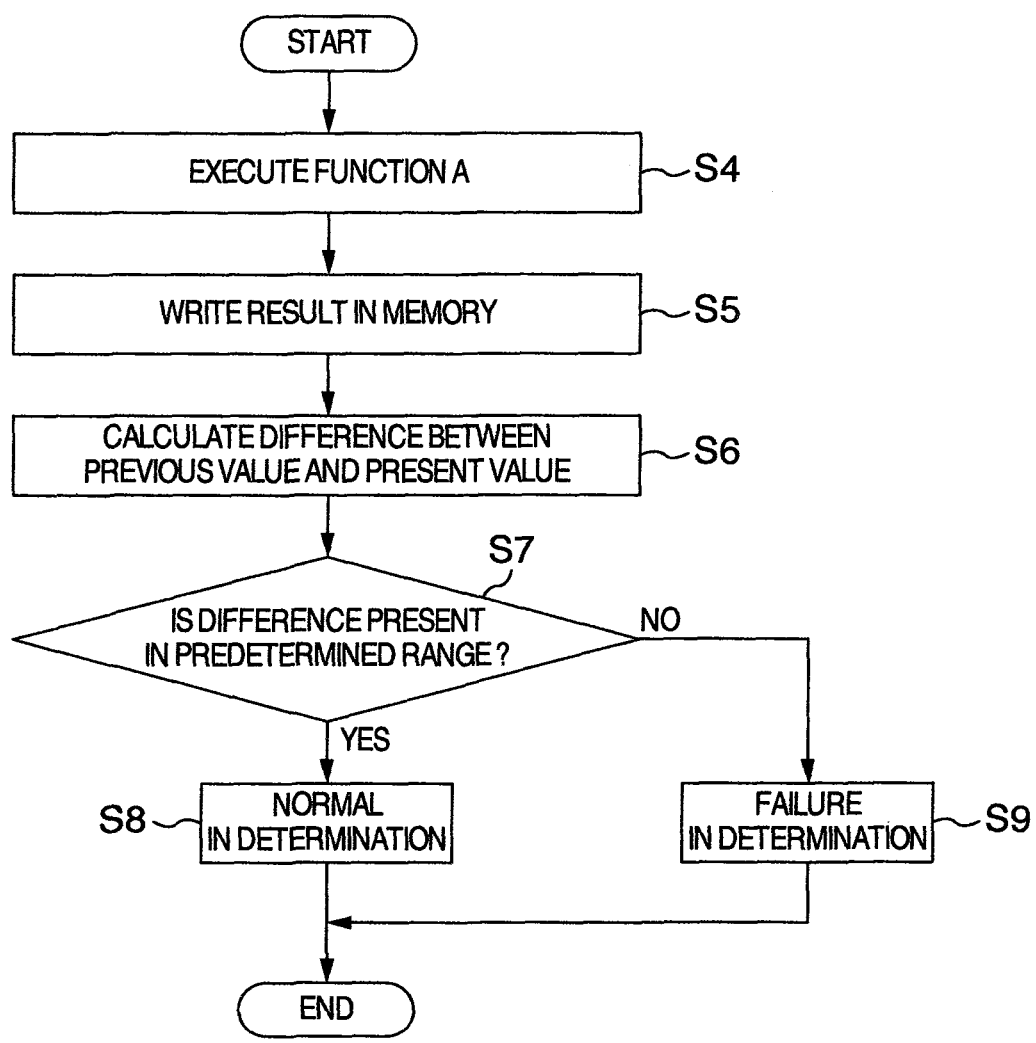
FIG. 6 is a flowchart showing an operation relative to a failure determination in one cycle of a task for the respective cores in a first embodiment.

The failure determination at the step S3 in FIG. 4 will be described with reference to FIG. 6. FIG. 6 is a flowchart showing an operation relative to the failure determination in the process in one cycle of the task for the respective cores. The function A is executed at a step S4. A value obtained from the execution of function A is stored in a memory at a step S5. Here, an area to be stored can be of the RAM 9 shown in FIG. 2 for example, but may be of a memory area in the CPU 7 if there is a cache memory mounted thereon. A difference between a previous value and a present value is calculated at a step S6. The previous value is a value stored by the process at the step S5 for another core in the previous cycle. The present value is a value stored by the process of the step S5 in this task. A difference value calculated at the step S6 is checked at a step S7. If the difference value is present in a predetermined range, the process proceeds to a step S8. If it is present outside, the process proceeds to a step S9. At the step S8, the core is determined as a normal state, and it is determined as a failure state at the step S9.

The following description will be concerned with a specific example of the operation from the steps S4 to S9. Assuming that the function A is set to an enumeration function of a fuel injection width in the gasoline injection type internal combustion engine, a fuel injection width Ti can be calculated by the following expression (1).

$$Ti = K \times Qa/Ne \times Coef + Ts \quad (1)$$

where Ti is a fuel injection width (ms), K is a proportional constant, Qa is an air flow (kg/s), Ne is a revolution (r/min), Coef is a coefficient of air-fuel ratio correction, and Ts is an invalid injection time (ms).

Figure 7A:
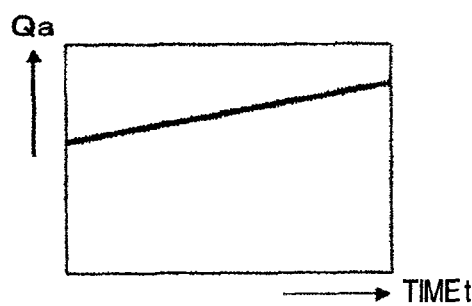
FIGS. 7A, 7B and 7C are graphs representing variations of an air flow amount Qa, an engine revolution Ne and a fuel injection width Ti at a time t.
Figure 7B:
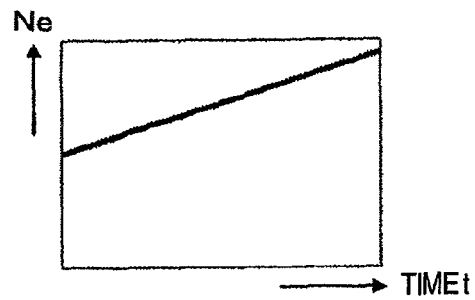
Figure 7C:
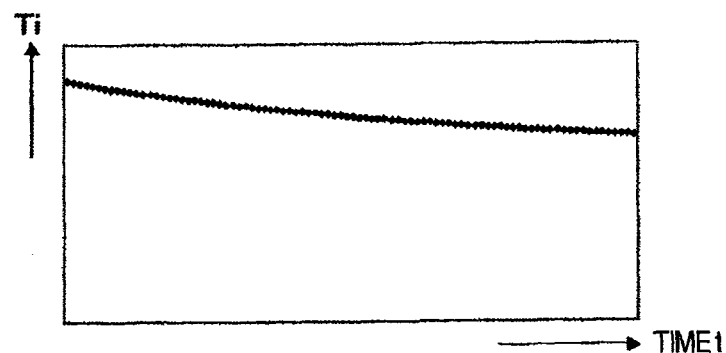

Here, the air flow Qa is calculated from an input signal of the air flow sensor, and the revolution Ne is calculated from an input signal of the revolution sensor. The proportional constant K, coefficient of air-fuel ratio correction Coef and invalid injection time Ts, are stored in the ROM 8 in advance. FIGS. 7A, 7B and 7C are graphs showing the value of fuel injection width Ti with respect to the variation of the air flow Qa and revolution Ne. The fuel injection width Ti is also varied continuously since the air flow Qa and revolution Ne vary continuously in response to the motion of vehicle.

Figure 8:
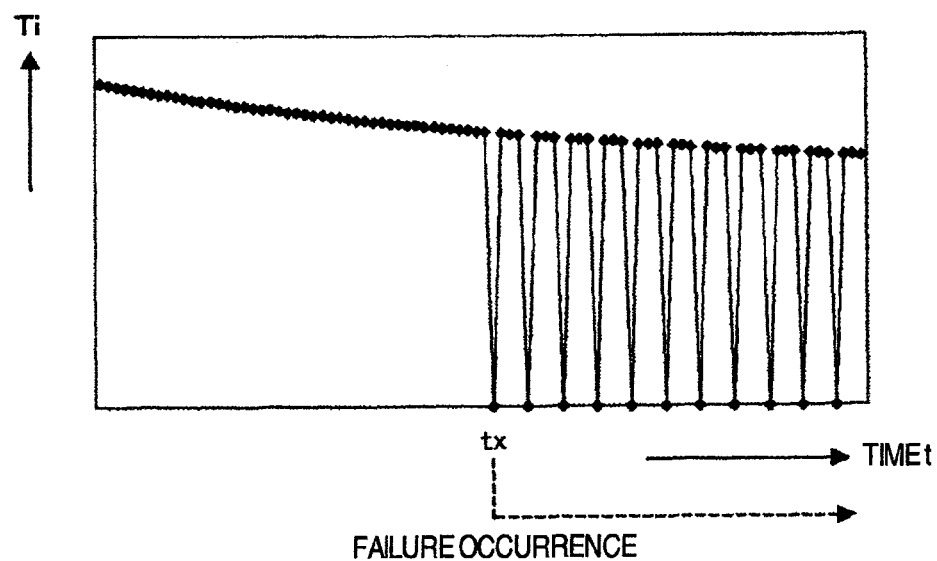
FIG. 8 is a graph of the fuel injection width Ti in the case where a failure occurs on a core.

FIG. 8 is a graph of the fuel injection width Ti when a calculated result for the core becomes "0" by occurring the failure on a specific core. In this case, a total number of cores are four and it is assumed that the failure core is one among the four. If the failure occurs at a time tx, a curve becomes intermittently and a continuity is disappeared, as shown in FIG. 8. This is because the calculated result obtained from the failure occurred on a core alone becomes "0" since the calculation is executed on another core at every cycle as shown in FIG. 5.

Figure 9:
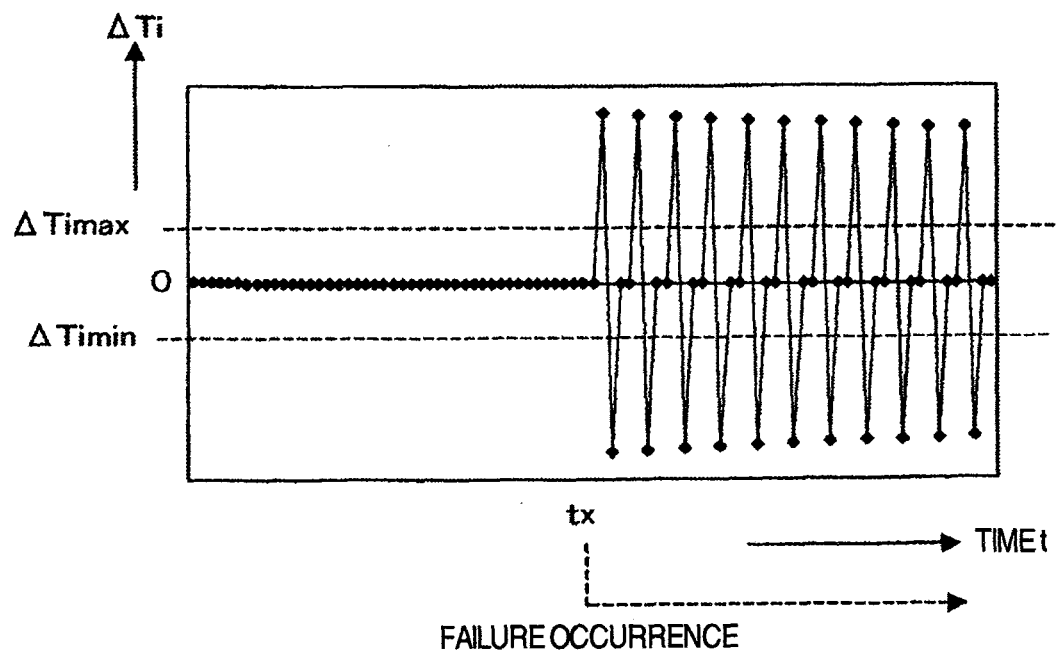
FIG. 9 is a graph of a difference ΔTi between a previous value and a present value.

FIG. 9 is a graph showing a calculated result of a difference $\Delta Ti$ between the present value and the previous value executed by the process at the step S6. In FIG. 9, the difference $\Delta Ti$ indicates around a "0" point at a time earlier than the time tx before which the core failure occurs, however, the difference $\Delta Ti$ intermittently varies up and down large on and after the time tx after the core failure, so that the continuity is disappeared. Assuming that a possibly taken value of the difference $\Delta Ti$, at which the core is normal, is set to a lower limit value $\Delta Timin$ and an upper limit value $\Delta Timax$, the predetermined range is set to $\Delta Timin$ to $\Delta Timax$ in the failure determination process at the step S7. In this way, the core can be determined as the normal state at the step S8 when the difference $\Delta Ti$ is present in the predetermined range. When the difference $\Delta Ti$ is present outside the predetermined range, the core on which the present value is executed in the computation process, can be determined as the failure state at the step S9 at a timing when the present value is executed in the computation process.

Figure 10:
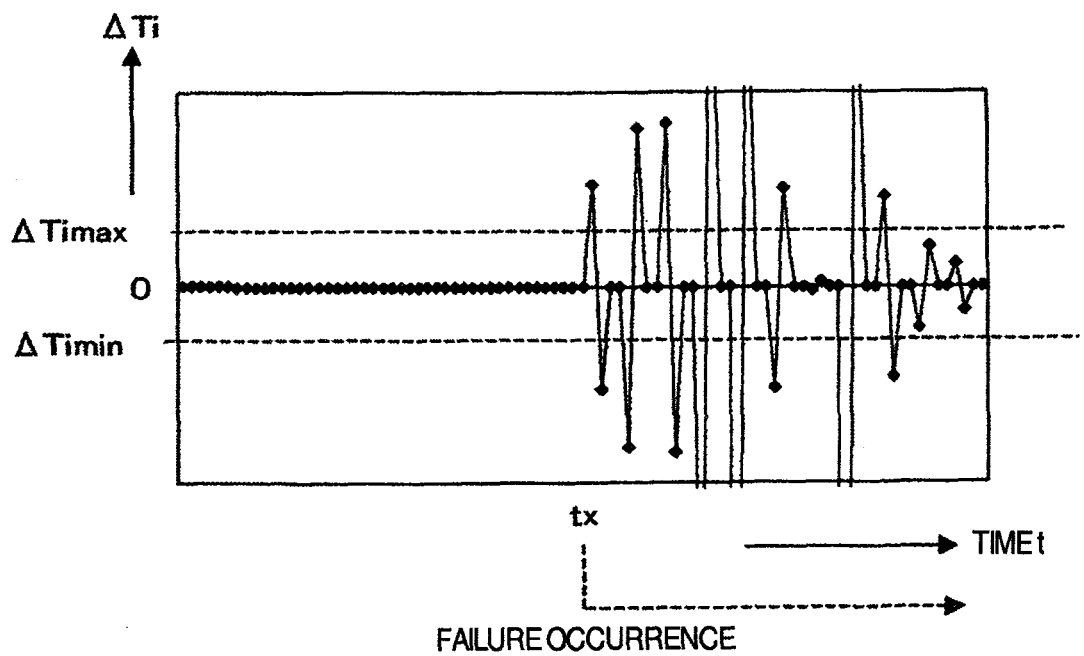
FIG. 10 is a graph of the fuel injection width Ti in the case where a calculated result of the core becomes an arbitrary value, when the failure occurs on the core.

FIG. 10 is a graph showing the fuel injection width Ti in the case where the calculated result of the core becomes a random or arbitrary value when the failure occurs on the core. In also this case, the difference $\Delta Ti$ arises over the predetermined range $\Delta Timin$ to $\Delta Timax$ on and after the time tx, so that the failure determination can be executed.

In addition, the difference between the previous value and present value is calculated in this embodiment so that the continuity of time variation in the calculated result is monitored from the variation in the calculated result obtained from a short cycle interval. However, the subject of the invention is not limited to the above description. The cycle in which the comparison is executed between the calculated results for the core failure determination, may be determined by the range of whether the continuity is present in the time variation of the calculated result. As one example, it is possible to execute the failure determination by using the difference between the present value and a last but one previous value. Further, in the case of the control such that a response is slow for such as a temperature control in a radiator and the computation cycle interval to be obtained is long, the determination of continuity is obtainable even though the cycle interval is set long for executing the comparison of the calculated results. However, it is desirable to execute the comparison of the calculated results in the short cycle interval, in relation to the control of quick response in such above-mentioned fuel injection control.

In this embodiment, the difference between the two calculated results has been described as comparison means for the calculated results, however, any means may be acceptable if the means can judge whether the continuity is present in the time variation of the calculated result. For example, a division process is applied to the previous value and the present value, and this result may be determined whether it is present in the predetermined range. Further, the computation process is applied sequentially to a first calculated result, a second calculated result and a third calculated result, and the second calculated result among three values may be determined whether it is present in a range between the first and third calculated results.

The assignment of the computation process unit may be executed in any order, that is, the order may be irregular if the cores for executing the comparison of the calculated results are not the same. From a viewpoint of reducing the computation burden, it is desirable that the same computation processes are not executed simultaneously on the different cores, respectively, however, a part of the computation process may be executed simultaneously on the plural cores, depending on a design schedule. That is, before the computation process is terminated on a certain core, the computation burden can be reduced at a time when the computation processes are not overlapped with each other even though the same computation processes start next.

The computation process unit available in the invention may not have the continuity strictly for the time variation of the calculated result, and may be expected for a substantially constant continuity. For example, the PWM (Pulse Width Modulation), the output of which is intermittently repeated as an H output and an L output, can expect the substantially constant continuity of an output since an integral value of the output has the continuity.

In this above-mentioned system, it is not required to provide a monitor dedicated core, therefore, there is an advantage that all of the cores can be used for a normal process. Further, it is not required to execute the failure determination by giving the process a redundancy and executing respectively the same processes on the plural cores simultaneously, therefore, there is an advantage that the resource of core can be used effectively. Further, since the failure determination is executed by using the computation process, without change, necessary for the vehicle control by using the vehicle control signal indicating that a possibility of varying suddenly at every computation cycle is low, a special test program is not required. Therefore, there is an advantage that the increase of computation burden for the failure determination can be restrained. Further, the at least three or more processors or cores are required for executing the comparison in a decision by majority. However, according to the configuration in this embodiment, any number of cores may be acceptable if it is two or more. Therefore, there is an advantage that the number of cores is less limited.

Second Embodiment

A second embodiment of the invention will be described below. A different point of this embodiment from the first embodiment is the failure determination at the step S3. This operation will be described with reference to a flowchart in FIG. 11.

An operation of steps S4 and S5 is the same as that shown in FIG. 6. The process following the step S5 proceeds to a step S10. At the step S10, a difference between a moving average value stored in advance and the present value is calculated. The moving average value will be described later at a step S11. An operation of steps S7 to S9 is the same as that shown in FIG. 6. When the core is determined as the normal at the step S8, the process proceeds to the step S11. At the step S11, the present value is added to the moving average value stored in advance to calculate a new moving average value. A calculation method of the moving average value may be a method of a simple moving average or a weighted moving average. The determination at the step S7 is executed on and after third of the task cycle since the value for at least amount of twice is required for the calculation of moving average value.

Figure 12:
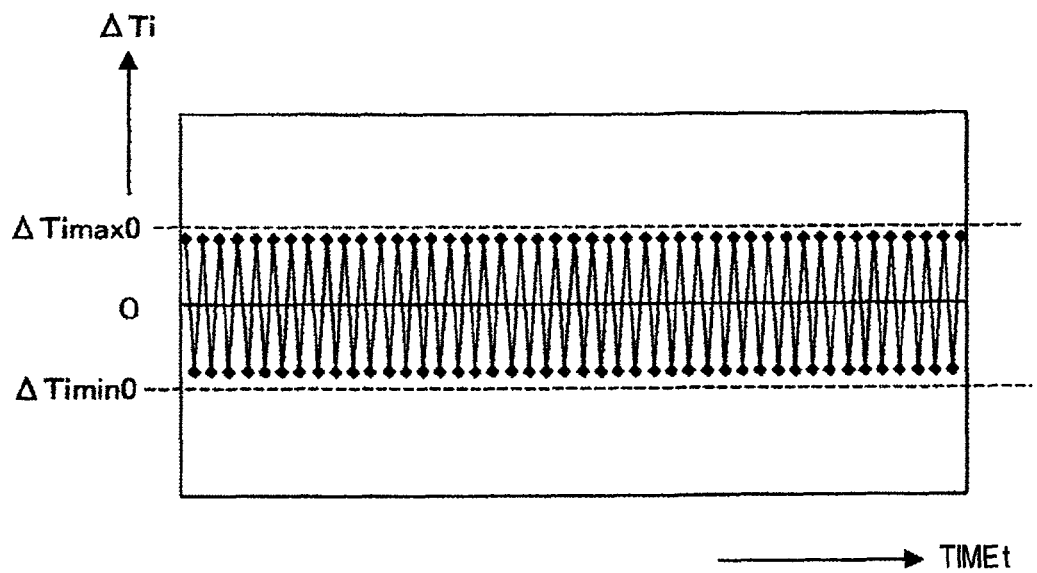
FIG. 12 is a graph of the difference ΔTi between the previous value and the present value when the fuel injection width Ti becomes a vibration state.
Figure 13:
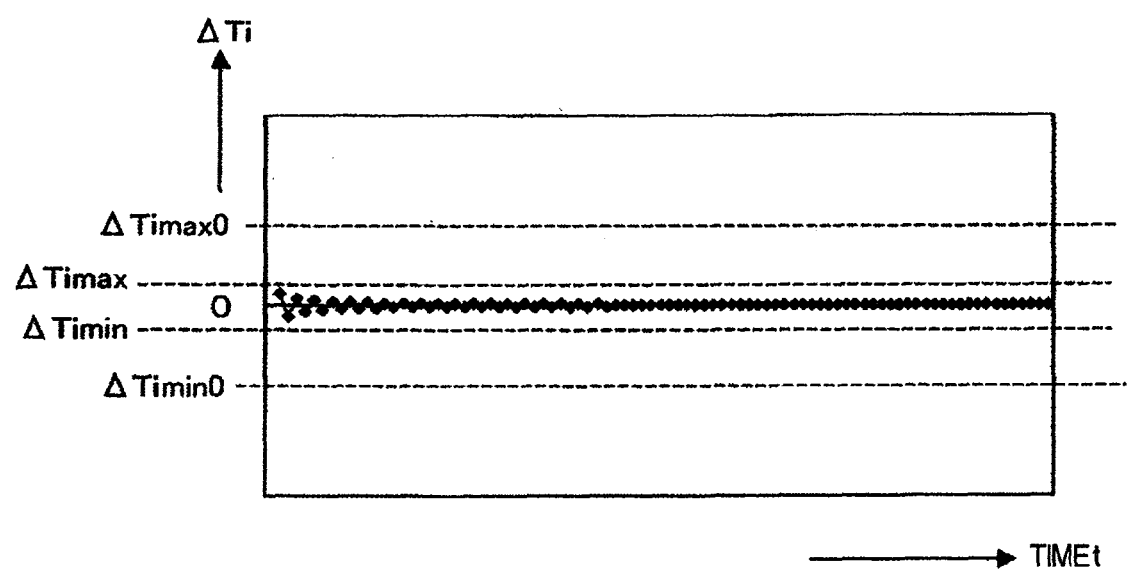
FIG. 13 is a graph of the difference ΔTi using a moving average value as the previous value when the fuel injection width Ti becomes the vibration state.

Advantages of this embodiment will be described with reference to FIG. 12 and FIG. 13. FIG. 12 is a graph showing a result obtained from the calculation of the difference ΔTi between the previous value and the present value in the process at the step S6, by using the above-mentioned method in the first embodiment. Here, the difference ΔTi represents a condition where the fuel injection width Ti becomes a vibrating state in the calculated result of the function A. This condition corresponds to the case where the air flow Qa cannot be controlled in accordance with a desired control amount calculated on the basis of the signal of air flow sensor, caused by a deterioration of a throttle value, for example. Here, the predetermined range ΔTimin0 to ΔTimax0 requires a range of a vibration amplitude. FIG. 13 is a graph showing a result obtained from the calculation by using the moving average value and the difference ΔTi between the previous value and present value by the process at the step S10 in this embodiment. As described above, the differenceΔTi becomes converged even though the fuel injection width Ti is under the vibrating state, and the predetermined range ΔTimin to ΔTimax is converged to a narrow range, compared with the predetermined range ΔTimin0 to ΔTimax0 in FIG. 12.

According to the configuration in this embodiment, a variation width of the difference can be restrained by using the moving average value, so that the predetermined range of the failure determination can be set narrow. Therefore, an area capable of determining the failure becomes increased. In consequence, there is an advantage that an accuracy of the failure determination can be improved.

Third Embodiment

A third embodiment will be described below, which corresponds to claim 3 in the invention. A different point of this embodiment from the second embodiment is the failure determination at the step S3. This operation will be described with reference to a flowchart in FIG. 14.

An operation of steps S4 and S5 is the same as that in FIG. 6. The process following the step S5 proceeds to a step S12. At the step S12, the predetermined range for use in the step S7 is calculated from the moving average value stored in advance. A calculation method of the predetermined rage corresponds to the following expressions (2), (3).

$$\Delta Timin = -\alpha \times |moving\ average\ value| \quad (2)$$

$$\Delta Timax = +\alpha \times |moving\ average\ value| \quad (3)$$

where α is an arbitrary coefficient equal to or greater than 1. This value makes large to be able to reduce an error determination for the failure determination, in contrast, it has a property of such that a detection accuracy becomes low for the failure. The calculation method of using the expressions (2) and (3) are used in this case, but any calculation methods may be acceptable if they are based on the moving average value. The process following the step S12 proceeds to the step S10. An operation of steps S10 to S11 is the same as that in FIG. 11.

In the above-mentioned system, since the predetermined rage is not required to set in advance, there is an advantage that an optimal predetermined range can be obtained for a function which is difficult to make limitation for the range of the calculated result. Further, since the calculation method is employed by using the expressions (2) and (3), there is an advantage that a degree of the error determination for the failure determination and the detection accuracy of the failure, can be selected arbitrarily in response to a setting value of the coefficient.

Fourth Embodiment

A fourth embodiment will be described below. A different point of this embodiment from the first and third embodiments is the failure determination at the step S3. This operation will be described with reference to a flowchart in FIG. 15.

An operation of steps S4 to S7 is the same as that in FIG. 6. At the step S7, the difference value is determined. The process proceeds to the step S8 if the value is present in the predetermined range, and proceeds to a step S12a if the value is present outside.

At the step S12a, a failure counter is incremented by 1. The process then determines whether the failure counter exceeds a predetermined number of times at a step S13. If the failure counter does not exceed the predetermined number of times, the process proceeds to the step S8. If it exceeds the predetermined number of times, the process proceeds to the step S9. An operation of steps S8 and S9 is the same as that in FIG. 6.

Figure 11:
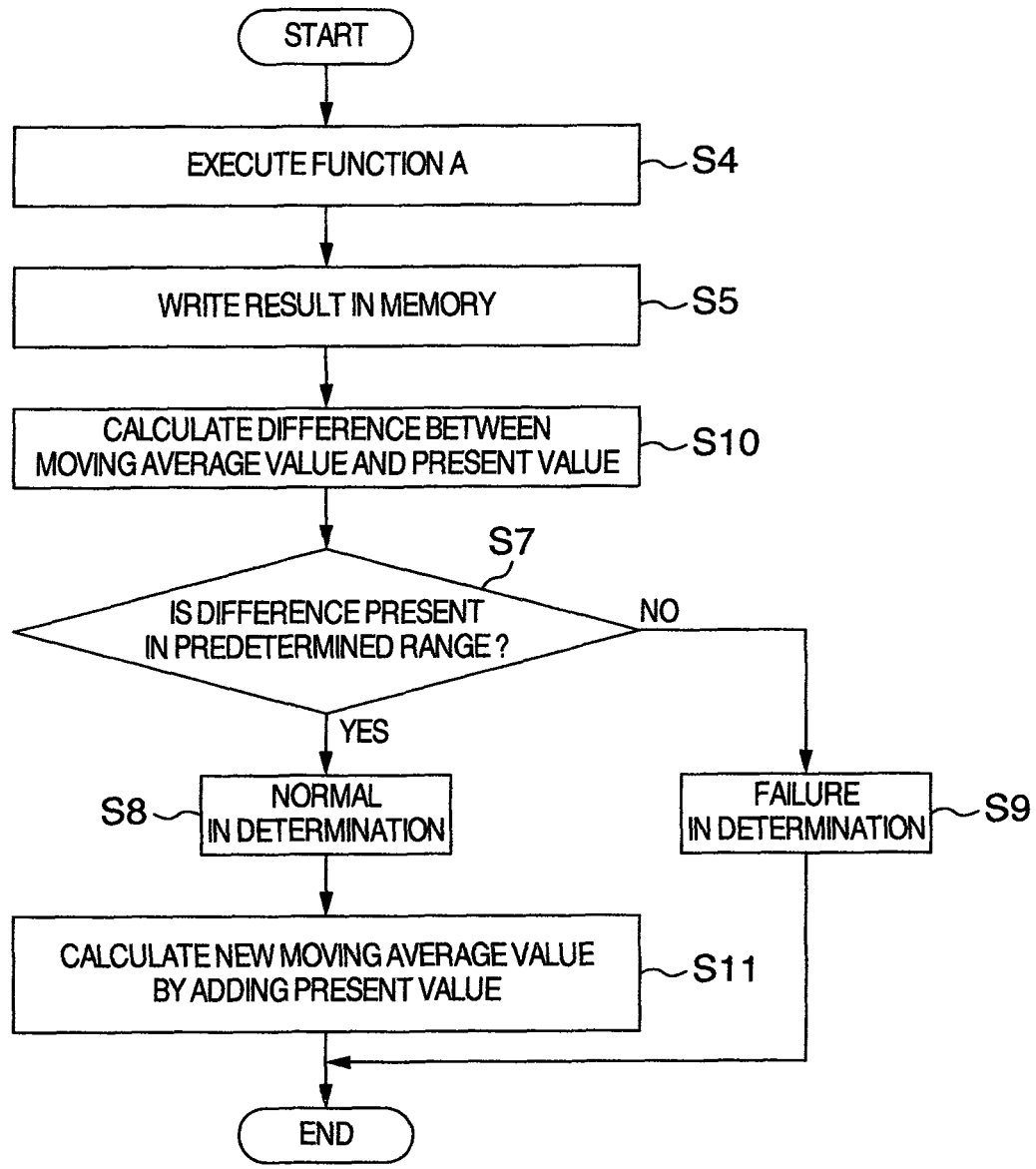
FIG. 11 is a flowchart showing an operation relative to the failure determination in one cycle of the task on the respective cores in a second embodiment.
Figure 14:
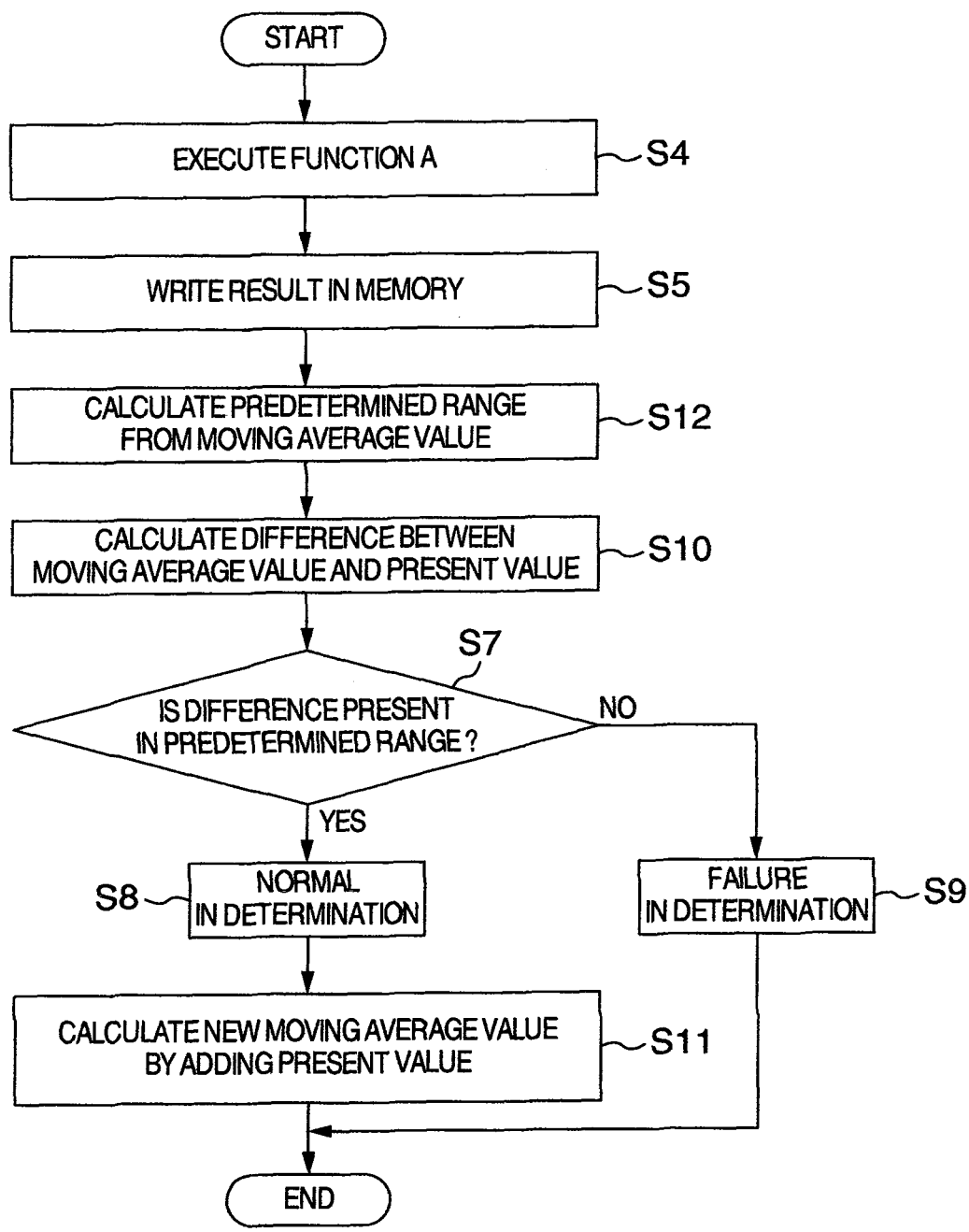
FIG. 14 is a flowchart showing an operation relative to the failure determination in one cycle of the task on the respective cores in a third embodiment.
Figure 15:
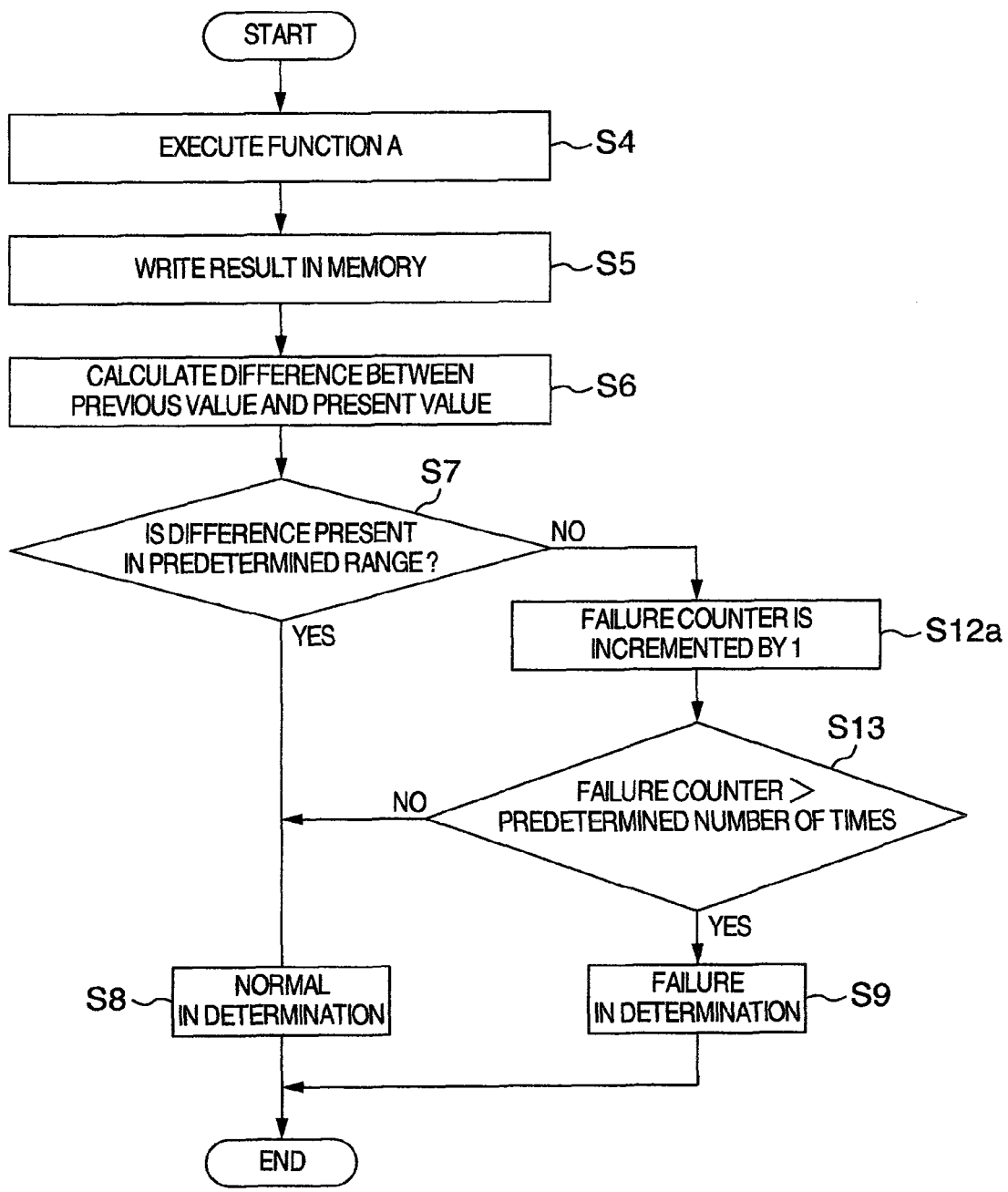
FIG. 15 is a flowchart showing an operation relative to the failure determination in one cycle of the task on the respective cores in a fourth embodiment.

Here, the operation in FIG. 15 is based on that in FIG. 6 of the first embodiment, but it is the same as based on that in FIG. 11 of the second embodiment and in FIG. 14 of the third embodiment.

In the above-mentioned system, since the failure is not determined immediately even though the value determined as the difference value at the step S7 is present outside the predetermined range, but determined in response to the failure counter, there is an advantage that the error determination for the failure can be restrained. There is also an advantage that the failure determination can be adapted to the cases where the failure occurs temporarily and the system is continuously used.

Fifth Embodiment

A fifth embodiment will be described below. A different point of this embodiment from the first to fourth embodiments is an operation of the OS in the CPU 7. This operation will be described with reference to a flowchart in FIG. 16.

An operation from steps S1 to S3 is the same as that in FIG. 4. At the step S3, if the core is the normal in determination (core failure is not present), the task process continues and the process returns again to the step S3. If the core is the failure in determination (core failure is present), the process proceeds to a step S14.

At the step S14, the task execution halts temporarily. At a step S15, the process of function A is assigned to the remaining cores except for the core determined as the failure at the step S3. The process following the step S15 returns to the step S2 to restart the task execution.

Figure 17:
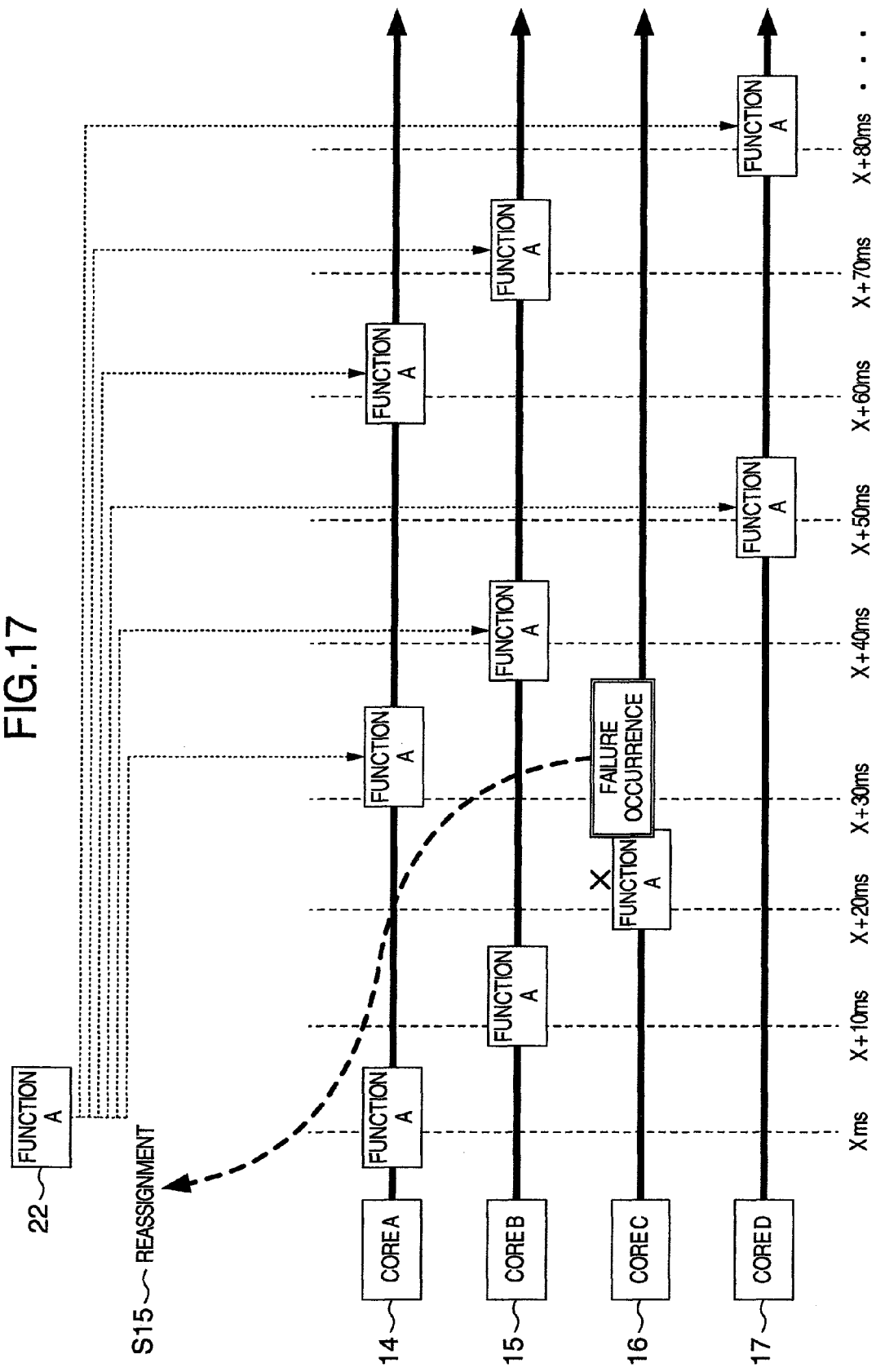
FIG. 17 is a diagram showing the process represented by the time axes for the assignment of function A and the respective cores in the fifth embodiment.

The assignment process at the step S15 will be described with reference to FIG. 17. FIG. 17 represents a process of the cores A to D (or 14 to 17) by time axes. The following description will be concerned with a different point of this process from that in FIG. 5. This example indicates that the failure occurs on the core C 16 at a time of X+20 ms. At this time, firstly, the task execution halts temporarily at the step S14. Secondly, the function A 22 is reassigned to the cores by a reassignment process at the step S15. In this case, the process of function A is assigned to the remaining core A 14, core B 15 and core D 17 except for the core C 16 on which the failure occurs. Here, not only the process of function A is reassigned thereto, but also all of the processes executed by the core C 16 may be assigned to the remaining cores. The task execution is then restarted after the reassignment process.

In the above-mentioned system, since the process continues executing on the remaining cores except for the arbitrary cores on which the failure occur, there is an advantage that the failure determination and process control can be carried on normally.

Sixth Embodiment

A sixth embodiment will be described below. A different point of this embodiment from the first to the fifth embodiments is the failure determination at the step S3. This operation will be described with reference to flowcharts in FIG. 18 and FIG. 19.

Figure 18:
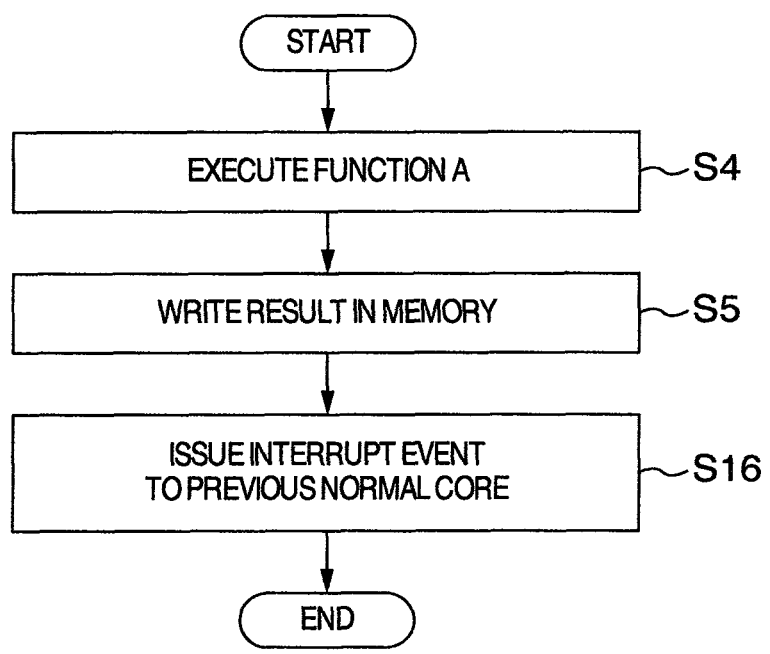
FIG. 18 is a flowchart showing an operation relative to the failure determination in one cycle of the task on the respective cores in a sixth embodiment.

An operation of steps S4 and S5 in FIG. 18 is the same as that in FIG. 6. The process following the step S5 proceeds to a step S16. At the step S16, an interrupt event is issued to the core determined as the normal in the previous computation cycle, and the process for this core terminates relative to the determination process.

Figure 19:
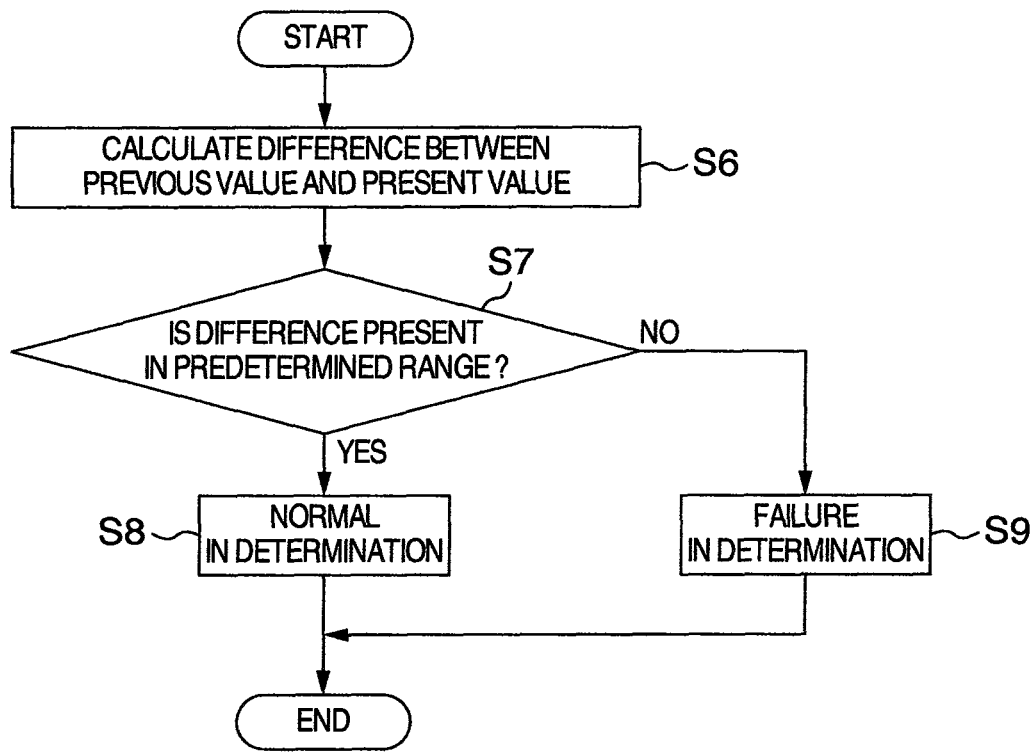
FIG. 19 is a flowchart showing an operation relative to the failure determination of the core subjected to an interrupt event in the sixth embodiment.

FIG. 19 shows an operation on the core subjected to the interrupt event at the step S16. A difference between the previous value calculated on the core subjected to the interrupt event and the present value calculated on the core issued the interrupt event is calculated at the step S6. The process from steps S7 to S9 is the same as that in FIG. 6 except for the process executed on the core subjected to the interrupt event.

Figure 20:
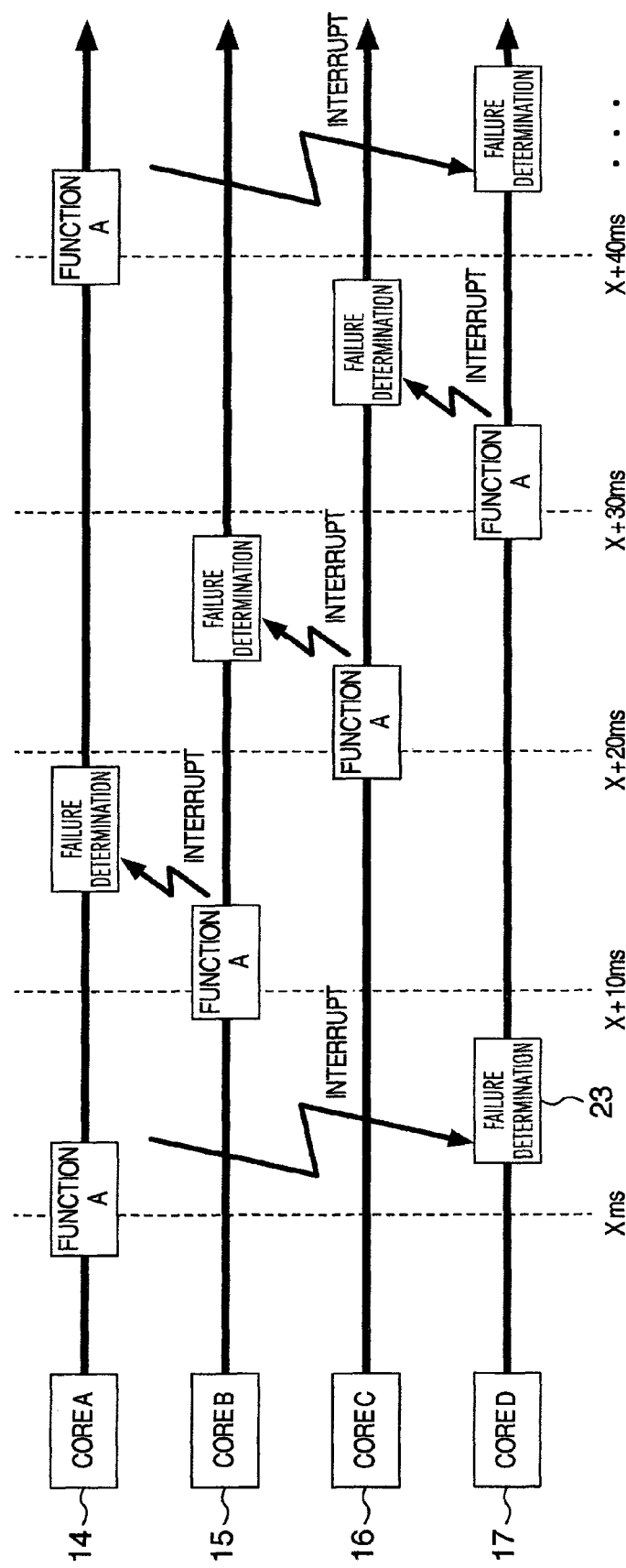
FIG. 20 is a diagram showing the process represented by the time axes for the respective cores in the sixth embodiment.

In the above-mentioned operation, FIG. 20 represents the process of the cores A to D (or 14 to 17) by the time axes. In the case of taking the time X ms as an example, the process of the function A is executed on the core A 14 at the step S4 in FIG. 18, and the interrupt event is issued to the core D 17 determined as the normal in the previous computation cycle at the step S16 through the step S5. A failure determination process 23 indicated from the steps S6 to S9 in FIG. 19 is executed on the core D 17 subjected to the interrupt event.

In this way, the failure determination process 23 is executed on the core determined as the normal in the previous computation cycle, so that a condition where the failure determination process 23 for the other core is assigned to the abnormally occurred core can be restrained. That is, there is an advantage that a condition where the failure occurs on the core to thereby occur an abnormality on the difference calculation at the step S6 to enter a difference result, which is normally present outside, into the predetermined range can be restrained, and a condition where the determination process at the step S7 is normally determined as the failure but determined as the normal can be restrained.

In this embodiment, the failure determination process 23 has been described by using the interrupt event, as an example. However, any realization means may be acceptable if the failure determination process 23 is executed on the core determined as the normal in the previous computation cycle, as a method, and the interrupt event is not necessarily essential in particular. Further, any one of the steps S6 to S9 may be executed on the core determined as the normal in the previous computation cycle.

Seventh Embodiment

A seventh embodiment of the invention will be described below. A different point of this embodiment from the first to the fifth embodiments is the operation of the OS in the CPU 7 and the failure determination at the step S3. This operation will be described with reference to flowcharts in FIG. 21 and FIG. 22.

Figure 16:
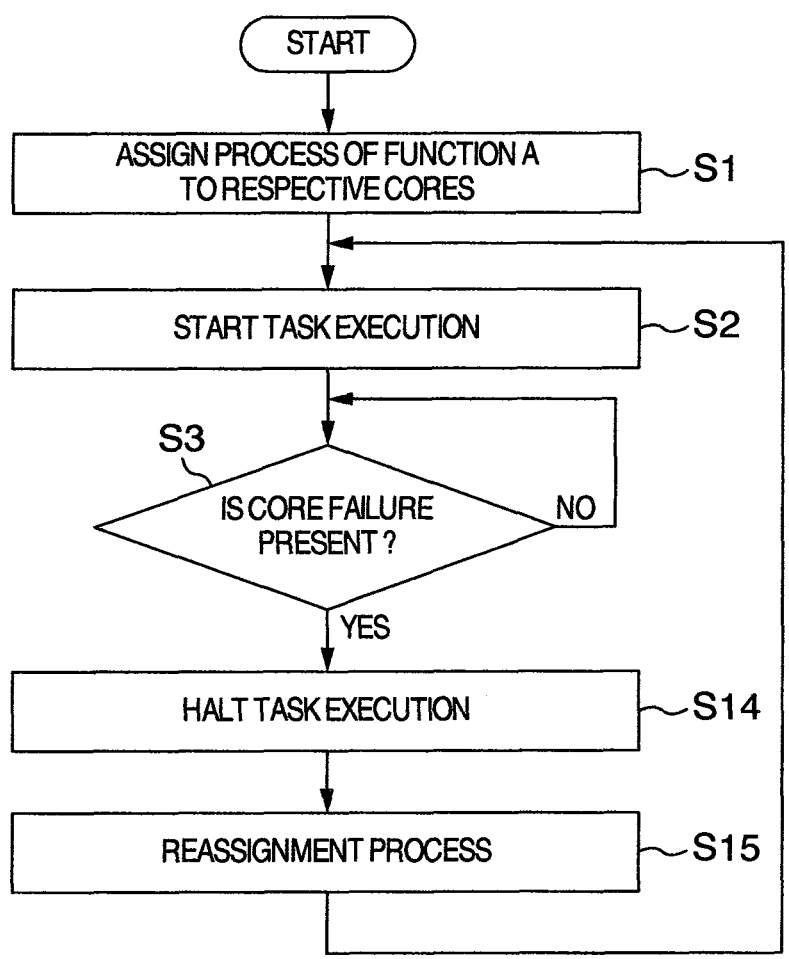
FIG. 16 is a flowchart showing an operation of an operating system (OS) in a fifth embodiment.
Figure 21:
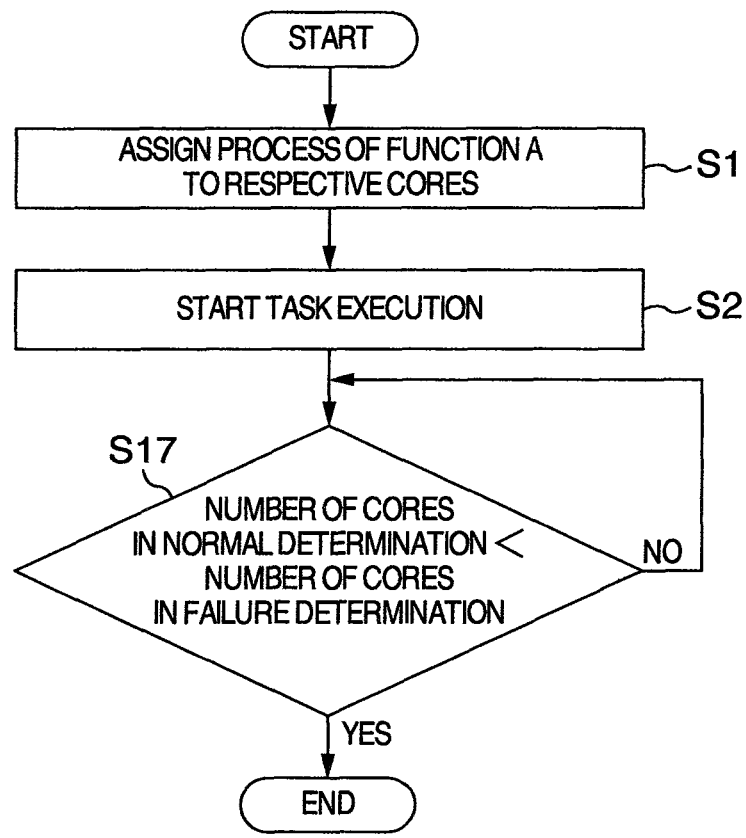
FIG. 21 is a flowchart showing an operation of an operating system (OS) in a seventh embodiment.

An operation of steps S1 to S2 in FIG. 21 is the same as that in FIG. 4. The process following the step S2 executes at a step S17. At the step S17, the result of core failure determination executed redundantly on at least three or more odd-numbered cores, is determined. Here, if the number of cores determined as the normal (core failure is not present) is less than the number of cores determined as the failure (core failure is present), it is regarded as that the determination is the normal state. The task process then continues and returns again to the step S17. If the other case occurs other than the above, it is regarded as that the process determines as the failure state to then terminate itself. Alternatively, the reassignment process may be executed as shown in FIG. 16 of the fifth embodiment.

Figure 22:
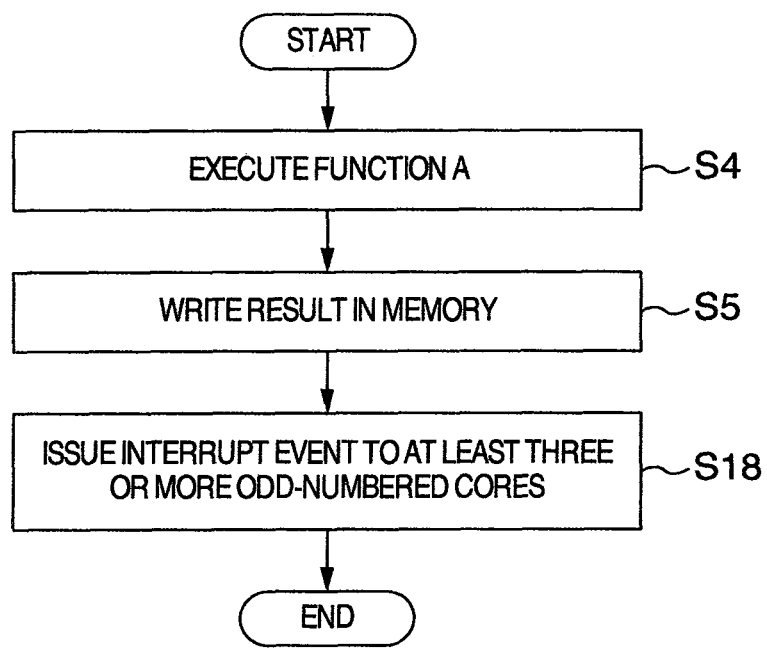
FIG. 22 is a flowchart showing an operation relative to the failure determination in one cycle of the task on the respective cores in the seventh embodiment.

The failure determination at the step S17 will be described with reference to a flowchart in FIG. 22. An operation of steps S4 and S5 is the same as that in FIG. 6. The process following the step S5 proceeds to a step S18. At the step S18, the interrupt event is issued to the at least three or more odd-numbered cores, and the process terminates for the cores relative to the determination process. The respective cores subjected to the interrupt event are subjected to the failure determination process shown in FIG. 19.

Figure 23:
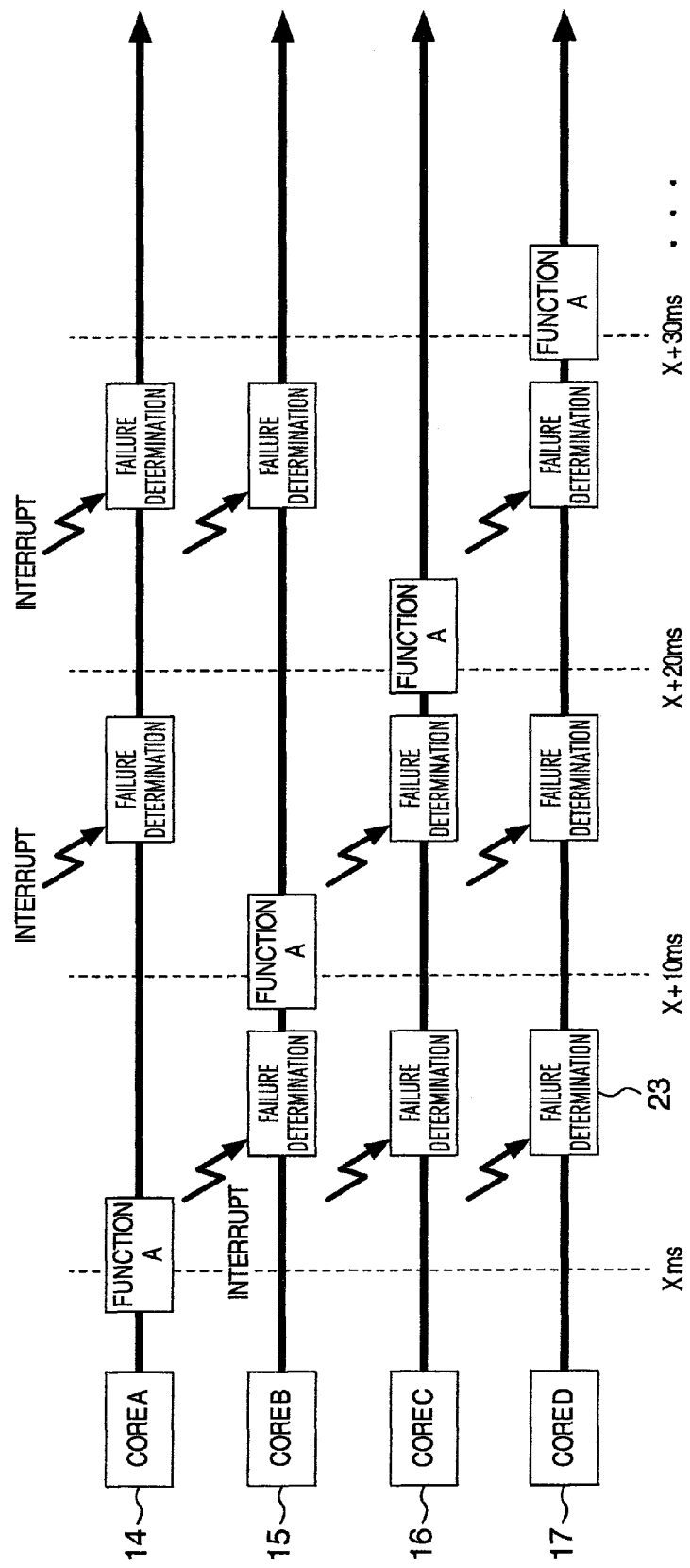
FIG. 23 is a diagram showing the process represented by the time axes for the respective cores in the seventh embodiment.

In the above-mentioned operation, FIG. 23 represents the process for the respective cores A to D (or 14 to 17) by the time axes. Here, the failure determination process 23 represents the process in FIG. 19. In the case of taking the time X ms as an example, the process of function A is executed on the core A 14 at the step S4 in FIG. 18, and the interrupt event is issued to the at least three or more odd-numbered cores at the step S18 through the step S5. The failure determination process 23 indicated by the steps S6 to S9 in FIG. 19 is executed on the respective cores subjected to the interrupt event.

In this way, the failure determination process 23 having a less computation burden is executed on the at least three or more odd-numbered cores, and these results are determined in the decision by majority. Therefore, there is an advantage that the reliability of failure determination can be improved while the increase of computation burden is restrained.

In this embodiment, the example has indicated that the failure determination process 23 is executed by using the interrupt event, but any realization means may be acceptable if the failure determination process 23 is executed on the at least three or more odd-numbered cores as methods, and the interrupt event is not necessarily essential in particular.

Further, any one of the processes at the steps S6 to S9 is executed on the at least three or more odd-numbered cores, so that the reliability for a part of the failure determination can be improved.

Eighth Embodiment

An eighth embodiment of the invention will be described below. A different point of this embodiment from the first to the fifth embodiments is the operation of OS in the CPU 7 and the failure determination at the step S3. This operation will be described with reference to flowcharts in FIG. 24 and FIG. 25.

Figure 24:
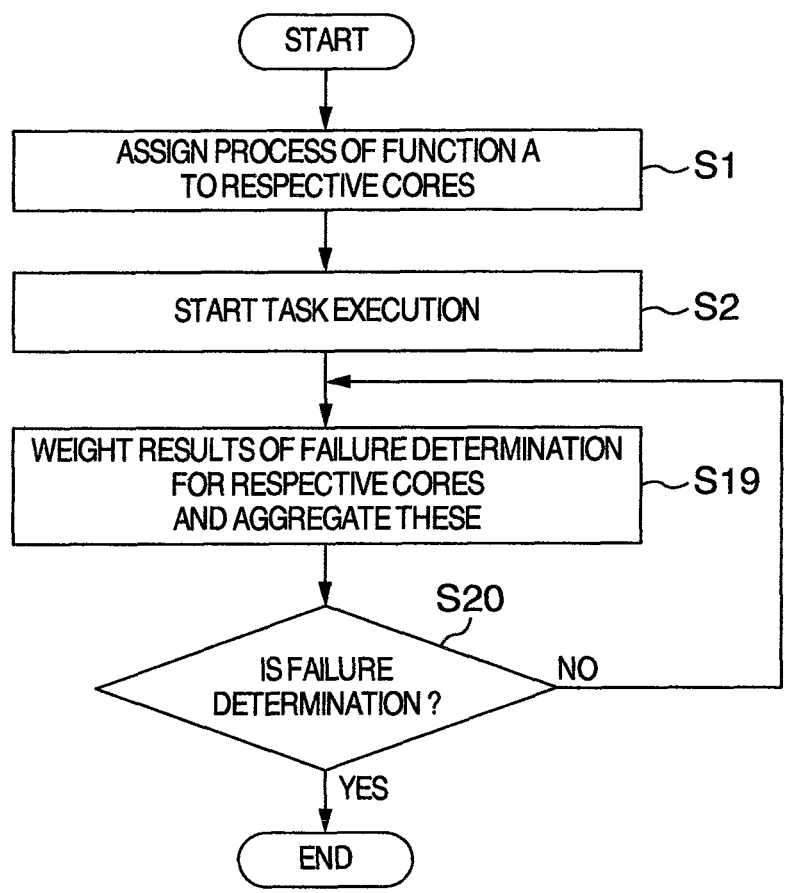
FIG. 24 is a flowchart showing an operation of the operating system (OS) in an eighth embodiment.

An operation of steps S1 to S2 in FIG. 24 is the same as that in FIG. 4. The process following the step S2 executes at a step S19. The results of the core failure determination executed redundantly on the at least two or more cores are weighted and aggregated at the step S19. A weighted calculation method can be taken as the following expression (4), as an example.

$$R = W1 \times C1 + W2 \times 2 + \ldots + Wn \times Cn \tag{4}$$

where R is an aggregated value; Wn is a weighting for a nth core (0 to 1); and Cn is a determined result value of a nth core, the normal at the determination is 0 and the failure at the determination is 1.

Here, the weighting may be set in accordance with an importance degree of process contents in the respective cores, alternatively, may be set in accordance with an elapsed time from a time when the respective cores are determined as the normal. The weighted calculation method is not limited to the expression (4), but arbitrary calculation methods may be used.

At a step S20, the failure determination is executed by using the aggregated result calculated at the step S19. For example, in the case of the aggregation executed by the expression (4) at the step S19, the failure is determined when the aggregated value R is equal to or greater than a predetermined value. When the normal state is determined, the task process continues and the process returns again to the step S19. If the other case occurs other than the above, it is regarded as that the process determines as the failure state to then terminate itself. Alternatively, the reassignment process may be executed as shown in FIG. 16 of the fifth embodiment.

Figure 25:
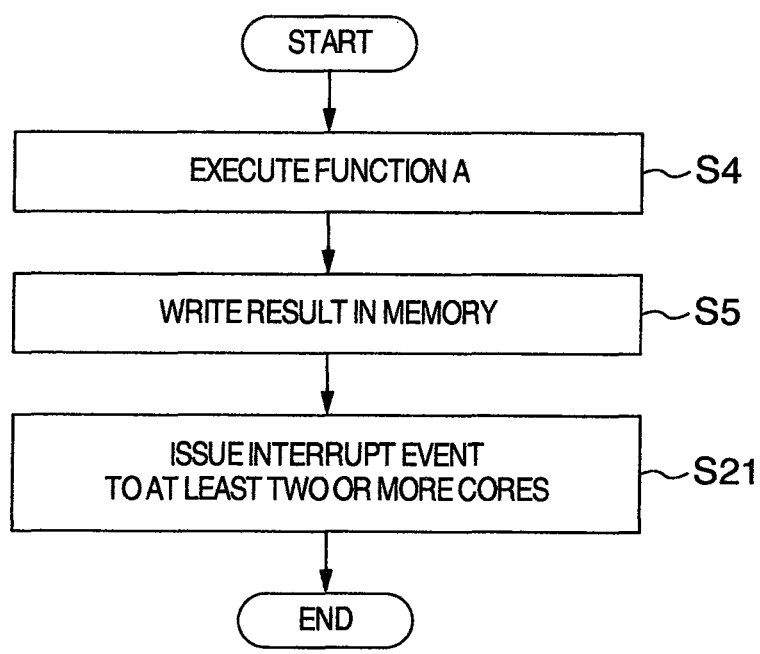
FIG. 25 is a flowchart showing an operation relative to the failure determination in one cycle of the task on the respective cores in the eighth embodiment.

The failure determination at the step S19 will be described with reference to a flowchart in FIG. 25. An operation of steps S4 and S5 is the same as that in FIG. 6. The process following the step S5 proceeds to a step S21. At the step S21, the interrupt event is issued to the at least two or more cores, and the process at the cores terminates in relation to the determination process. The respective cores subjected to the interrupt event are subjected to the failure determination process shown in FIG. 19.

In the above-mentioned operation, FIG. 23 represents the process for the respective cores A to D (or 14 to 17) by the time axes. Here, the failure determination process 23 represents the process in FIG. 19. In the case of taking the time X ms as an example, the process of function A is executed on the core A 14 at the step S4 in FIG. 18, and the interrupt event is issued to the at least two or more cores at the step S18 through the step S5. The failure determination process 23 indicated by the steps S6 to S9 in FIG. 19 is executed on the respective cores subjected to the interrupt event.

In this way, the failure determination process 23 is executed on the at least two or more cores, and these results are determined by the weighting and aggregation. Therefore, there is an advantage that the reliability of failure determination can be improved. There is also an advantage that the optimal failure determination can be executed by adding with a property and an importance degree of the cores even though these are different for every core. Further, any number of cores may be acceptable if it is two or more, therefore, there is an advantage that the number of cores is not limited.

In this embodiment, the example has indicated that the failure determination process 23 is executed by using the interrupt event, but any realization means may be acceptable if the failure determination process 23 is executed on the at least two or more cores as methods, and the interrupt event is not necessarily essential in particular.

Ninth Embodiment

Figure 26:
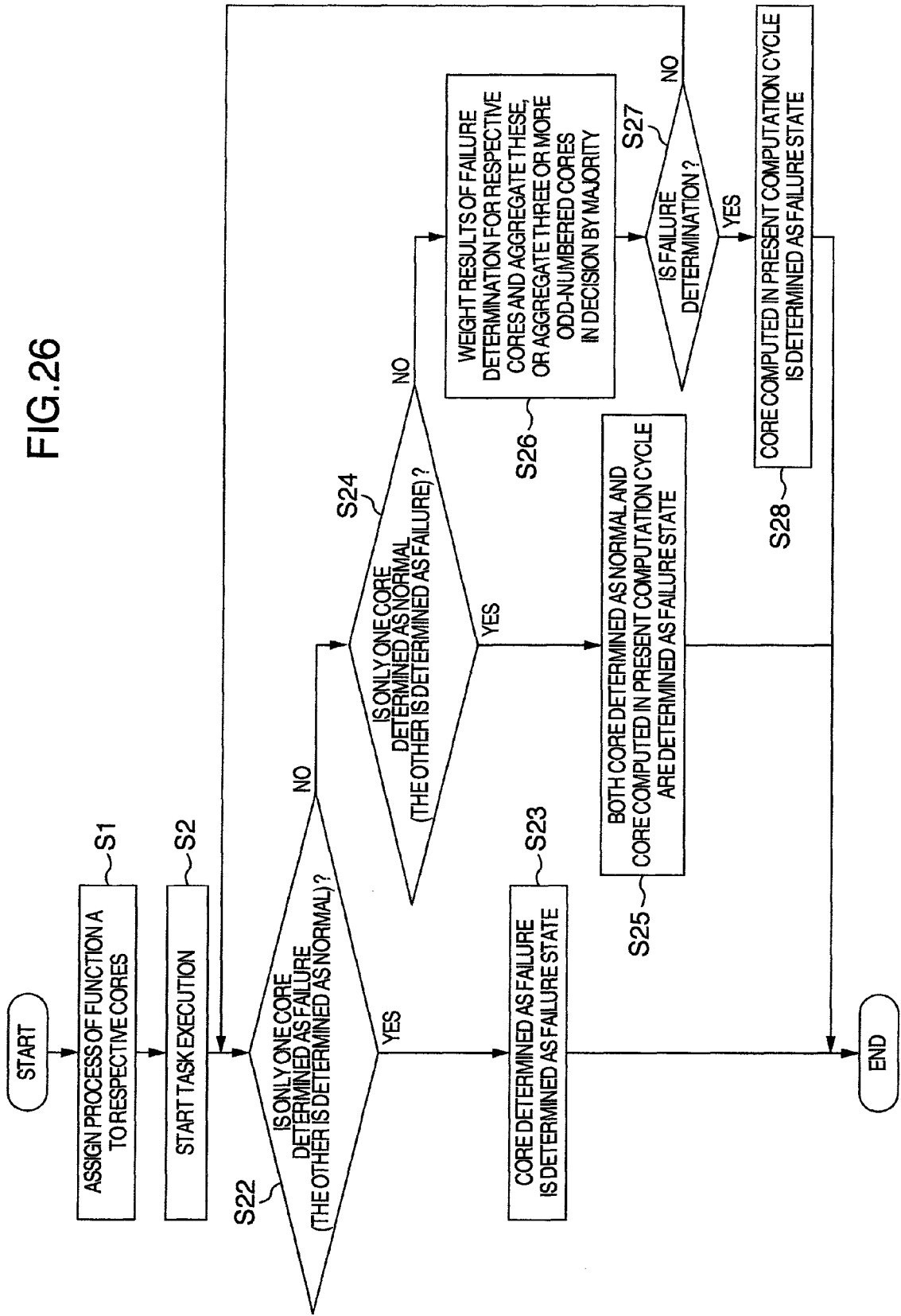
FIG. 26 is a flowchart showing an operation of the operating system (OS) in a ninth embodiment.

A ninth embodiment of the invention will be described below. A different point of this embodiment from the seventh or the eighth embodiment is the operation of OS in the CPU 7. This operation will be described with reference to a flow-chart in FIG. 26.

An operation from steps S1 to S2 is the same as that in FIG. 4. The process following the step S2 executes a step S22. At the step S22, the result of core failure determination, executed redundantly on the at least three or more cores, is determined. If only one core is determined as the failure and the other cores are determined as the normal, the process proceeds to a step S23 and then proceeds to a step S24 for the other case. At the step S23, the core (a single core) determined as the failure is judged as the failure state.

At the step S24, similarly to the step S22, the result of core failure determination, executed redundantly on the at least three or more cores, is determined. If only one core is determined as the normal and the other cores are determined as the failure, the process proceeds to a step S25, and then proceeds to a step S26 for the other case. At the step S25, both the core (a single core) determined as the normal and the cores computed in the present computation cycle are judged as the failure state.

The step S26 and step S27 either correspond to the failure determination process in the decision by majority at the step S17 in FIG. 21 of the seventh embodiment, or correspond to the failure determination process by the aggregation of the weighting to the respective cores at the steps S19 and S20 in FIG. 24 of the eighth embodiment. If the process determines as the normal at the step S27, the task process continues, and returns again to the step S22. If the process determines as the other case, the core computed in the present computation cycle is regarded as the failure state and the process terminates. Alternatively, the reassignment process may be executed as indicated in FIG. 16 of the fifth embodiment.

In this way, the failure determination process 23 is executed on the at least three or more cores, in consequence, if the only one core is determined as the failure and the other cores are determined as the normal, it is judged that the core computed in the present computation cycle has no abnormality and the other core (this is the only one core determined as the failure) has the failure. Therefore, there is an advantage that the error determination of failure can be reduced and the failure can be detected for the core other than cores computed in the present computation cycle. Further, if the only one core is determined as the normal and the other core is determined as the failure, it is judged that the failure occurs on both the core determined as the normal and the core computed in the present computation cycle, therefore, there is an advantage that the failure can be detected for two cores simultaneously.

Tenth Embodiment

Figure 27:
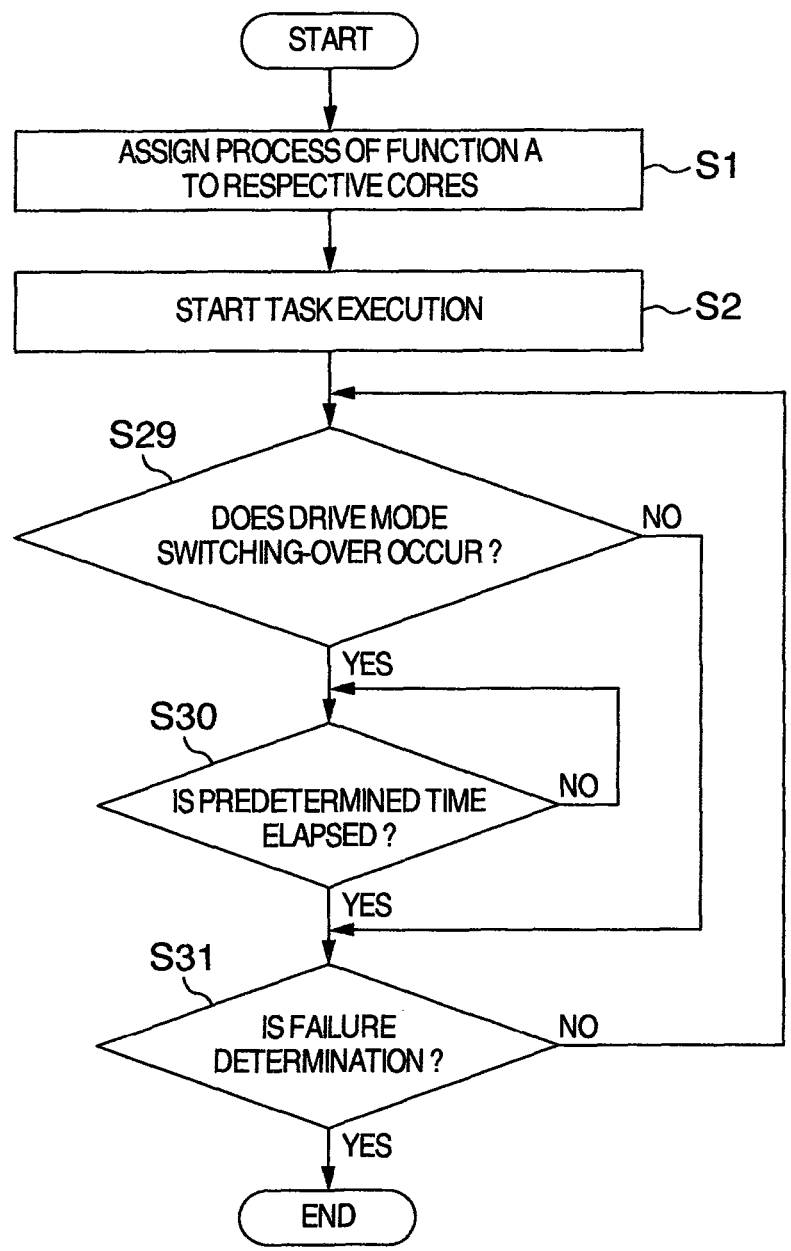
FIG. 27 is a flowchart showing an operation of the operating system (OS) in a tenth embodiment.

A tenth embodiment of the invention will be described below. A different point of this embodiment from the first to the ninth embodiments is the operation of OS in the CPU 7. This operation will be described with reference to a flowchart in FIG. 27.

An operation from steps S1 to S2 is the same as that in FIG. 4. The process following the step S2 executes a step S29. At the step S29, the process determines whether a switching-over of a drive mode occurs on the vehicle. Here, the drive mode means that a vehicle condition is set to various states, including an engine stall state, a cranking state, an engine running state and a shut down state, in the gasoline injection type internal combustion engine. Any drive modes may be acceptable if they have a possibility to be effect on the computation of function A for use in the failure determination, and a newly setting drive mode may also be acceptable for the failure determination. The process proceeds to a step S30 if the switching-over of drive mode occurs at the step S29, and proceeds to a step S31 if it does not occur. At the step S30, it is determined whether a predetermined time period is elapsed from an occurrence of the switching-over in the drive mode.

If the predetermined time period is elapsed, the process proceeds to the step S31, and if it is not elapsed, the process returns again to the step S30. An operation at the step S31 is the same as that in the step S3 in FIG. 4. The task process then continues when the determination is the normal (core failure is not present), and the process returns to the step S29. The process terminates when the determination is the failure (core failure is present). Alternatively, the reassignment process may be executed as shown in FIG. 16 of the fifth embodiment.

When changing the drive mode, the vehicle control is often varied large as being a singularity, therefore, the calculated result of the function A for use in the failure determination is varied large, compared with the previous value, so that the continuity is often disappeared. In such case, the difference $\Delta Ti$ between the previous value and the present value sometimes exceeds the assumedly predetermined range $\Delta Timin$ to $\Delta Timax$ when executing the failure determination by using the difference, therefore, there is a possibility that the error determination occurs as the failure state. In this embodiment, a failure determination idle period is provided as a predetermined time period, for a condition where the above-mentioned operation condition is varied suddenly, therefore, there is an advantage that the error determination of failure can be restrained.

Eleventh Embodiment

Figure 28:
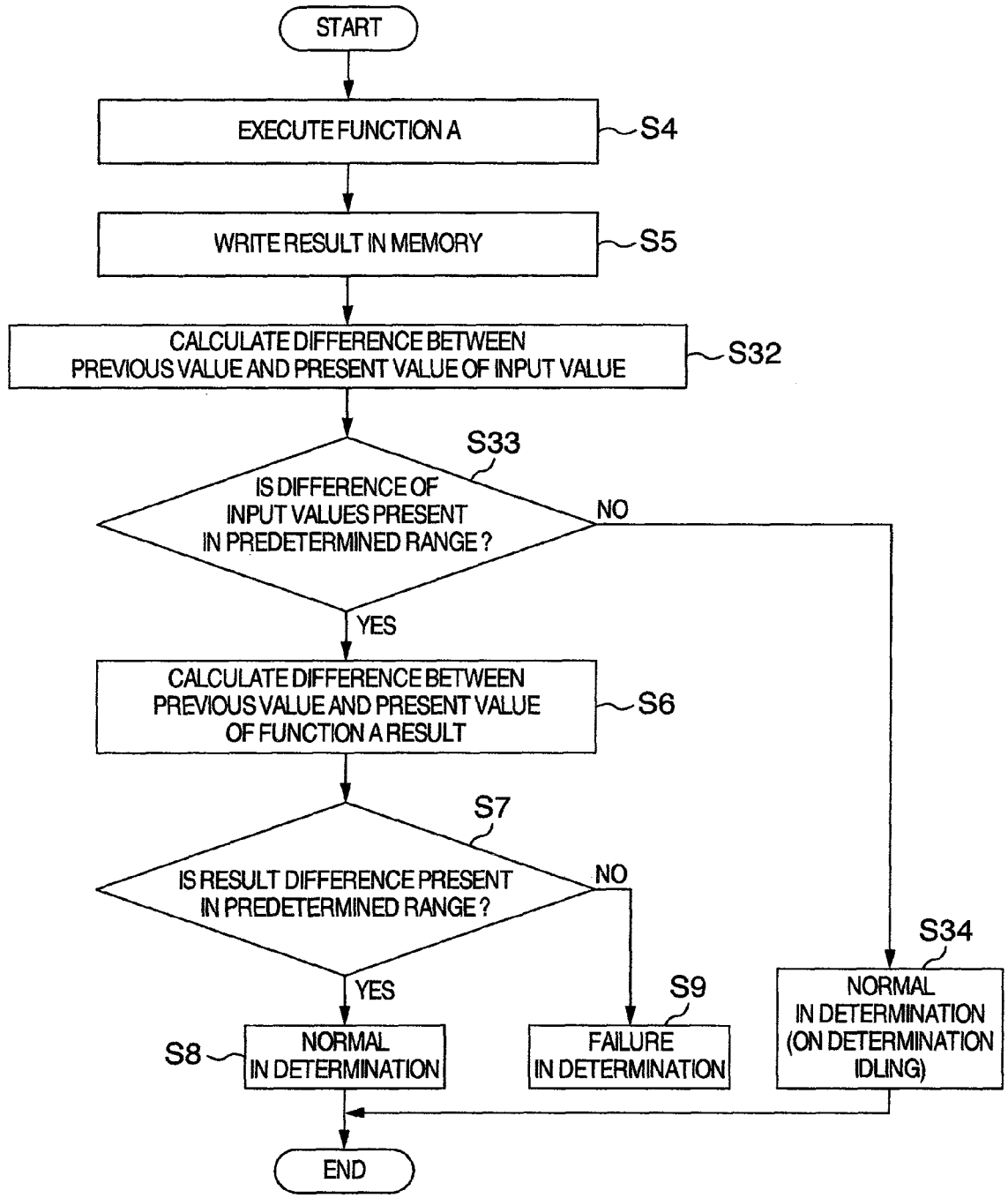
FIG. 28 is a flowchart showing an operation relative to the failure determination in one cycle of the task on the respective cores in an eleventh embodiment.

An eleventh embodiment of the invention will be described below. A different point of this embodiment from the first to the tenth embodiments is the failure determination at the step S3. This operation will be described with reference to a flowchart in FIG. 28.

An operation at steps S4 and S5 is the same as that in FIG. 6. The process following the step S5 proceeds to a step S32. At the step S32, either at least one or more input values for use in the function A is calculated, or differences between the plural previous values and present values are calculated respectively. At a step S33, the value of differences calculated at the step S32 is subjected to a determination. If the value is present in a predetermined range, the process proceeds to the step S6, and if it is present outside, the process proceeds to a step S34. Here, it can be assumed that, when the plurality of input values are subjected to the determination, the process proceeds to the step S6 if all of the input values are present in the range and to the step S34 if they are not corresponded thereto, as an example. However, the determination process may be executed by weighting in response to the importance degree of the input value, as another method.

An operation at steps S6 to S9 is the same as that in FIG. 6. At the step S8, the core is determined as the normal state. At the step S9, the core is determined as the failure state.

At the step 34, the core is determined as the normal state. Here, the determination may be set to as "on failure determination" in place of the normal state. "On failure determination" means a state which is neither the normal state nor the failure state. "On failure determination" is set to as a third state for preventing erroneous determination due to inappropriate condition, for example in the case that the operation state of internal combustion engine suddenly varies. Note that "on failure determination" may be set to as the normal state if the determination must be classified into the normal state or the failure state.

Further, the determination process of the input value at the steps S32 to S34 is executed on the same core of the task as executed the process of the function A at the step S4, but may be executed on the other core as shown in the sixth embodiment.

When the input value varies large, the executed result of function A is sometimes also varied large. However, when this variation exceeds the predetermined range ΔTimin to ΔTimax as described the failure determination in the first embodiment, the process determines erroneously as the failure. For a purpose of preventing the error determination, it is required that the predetermined range ΔTimin to ΔTimax should be made wide. For this reason, there is a drawback that the detection accuracy of failure is lowered. Consequently, the failure determination is not executed in the case where the input value is varied large, as described in this embodiment. Therefore, there is an advantage that the error determination can be restrained while the failure detection accuracy is remained. Further, there is an advantage that the error determination can be restrained effectively by selecting the input value which easily causes the error determination in particular and by weighting to the input value.

Twelfth Embodiment

Figure 29:
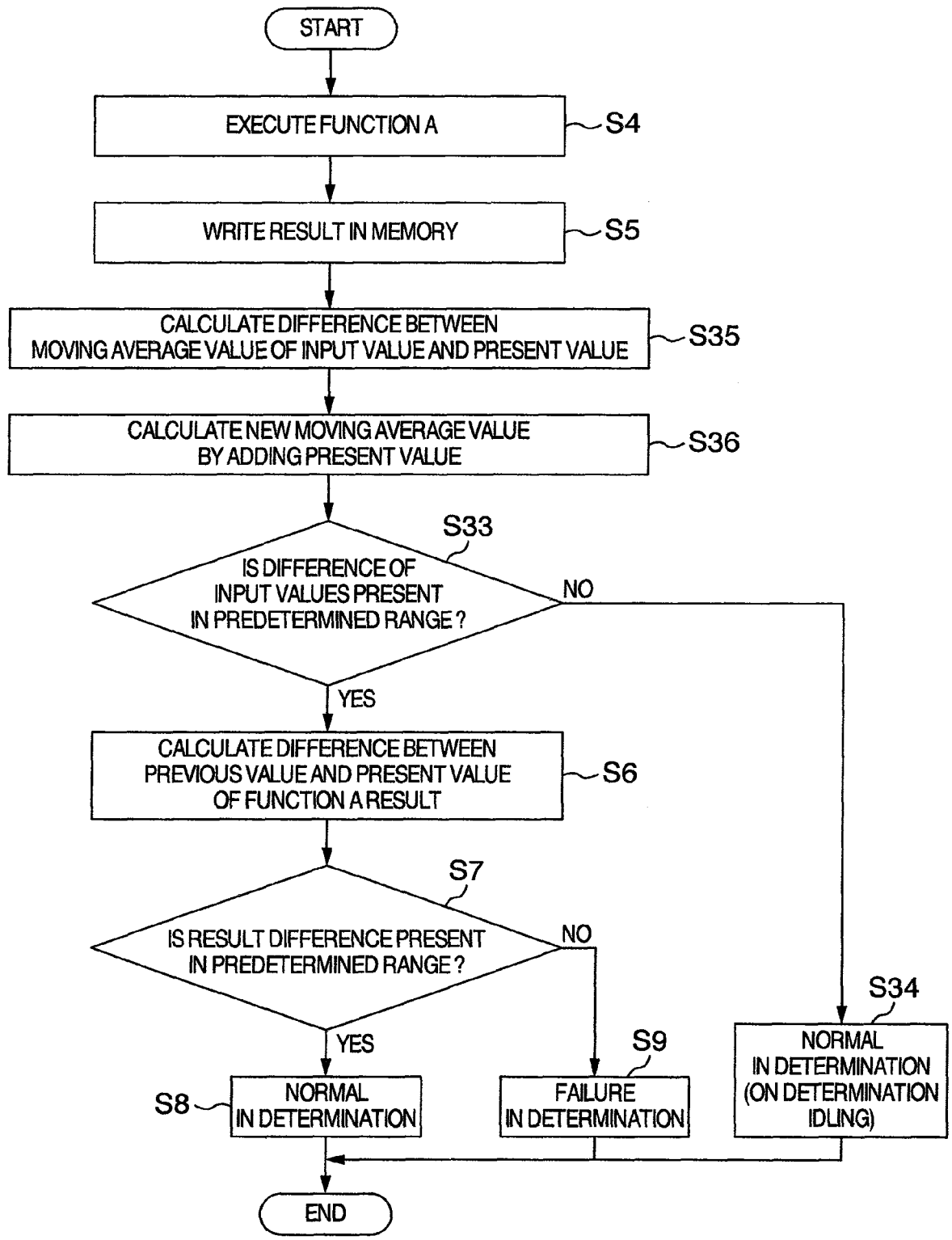
FIG. 29 is a flowchart showing an operation relative to the failure determination in one cycle of the task on the respective cores in a twelfth embodiment.

A twelfth embodiment of the invention will be described below. A different point of this embodiment from the eleventh embodiment is the failure determination at the step S3. This operation will be described with reference to a flowchart in FIG. 29.

An operation at steps S4 and S5 is the same as that in FIG. 6. The process following the step S5 proceeds to a step S35. At the step S35, either the at least one or more input values for use in the function A is calculated, or differences between the plural moving average values until a previous time and the present values are calculated respectively. At a step S36, the present value is added to the moving average value until the previous time to thereby calculate a new moving average value. Here, the calculation method for the moving average value may be the method of simple moving average or weighted moving average. An operation on and after the step S33 is the same as that in FIG. 28. Further, the determination at the step S33 is executed on and after third the task cycle since the calculation for the moving average value is required at least twice the values.

When the input value varies so as to be the vibrating state in the eleventh embodiment, the difference between the previous value and the present value vibrates up and down across a "0" point, similarly to the difference ΔTi in FIG. 12 of the second embodiment. In such case, for a purpose of increasing a chance of the failure determination, it is required that the predetermined range for use in the determination of the input value should be made wide. However, in this case, the input value varies large in the predetermined range, but the executed result of function A also varies large. Therefore, there is a possibility that the process determines erroneously as the failure, despite the normal state. Consequently, the moving average value is used in this embodiment so that the amplitude of the difference becomes small, similarly to FIG. 13 of the eleventh embodiment. Therefore, it is possible to make the predetermined range for use in the input value determination narrow. In consequence, there is an advantage that the process, which determines erroneously as the failure, can be restrained without decreasing the chance of the failure determination, and even though the input value varies suddenly.

Thirteenth Embodiment

A thirteenth embodiment will be described below. A different point of this embodiment from the twelfth embodiment is the failure determination at the step S3. This operation will be described with reference to a flowchart in FIG. 30.

An operation at steps S4 and S5 is the same as that in FIG. 6. The process following the step S5 proceeds to a step S37. At the step S37, the predetermined range for use in the step S7 is calculated from the moving average value of the input values stored in advance. A calculation method for the predetermined range can be used as the following expressions (5) and (6).

$$\Delta IAMINn = -\alpha ian \times |IAn| \quad (5)$$

$$\Delta IAMAXn = +\alpha ian \times |IAn| \quad (6)$$

where ΔIAMINn is a lower limit value of a determination range for an nth input value, ΔIAMAXn is an upper limit value of the determination range for the nth input value, αian is a calculation coefficient of the determination range for the nth input value, and Ian is a moving average value of the nth input value.

Here, αian is an arbitrary coefficient equal to or greater than 1, and this value is made large to be able to increase the chance of the failure determination, in contrast, a possibility to erroneously determine as the failure is also increased. This embodiment employs the calculation method with use of the expressions (5) and (6), but any calculation methods may be acceptable if its method is based on the moving average value. The process following the step S37 proceeds to the step S35. An operation on and after the step S35 is the same as that in FIG. 29.

In the above-mentioned system, it is not required to set the predetermined range for use in the input value determination in advance, therefore, there is an advantage that an optimal predetermined range can be obtained even in the case where it is difficult to limit the range capable of taking the input values. By employing the calculation method with use of the expressions (5) and (6), there is an advantage that the degree of determining as error of the failure determination and a frequency of the chance for the failure determination can be selected arbitrarily in response to a setting value of the coefficient.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A vehicle control system comprising:
   a plurality of cores,
   a device, mounted on a vehicle, that is controlled by the cores,
   wherein said control system executes a computation on the plurality of cores sequentially at specified timing using at least one continuously varying parameter obtained at each timing, uses a result of said computation process to control the device, performs a comparison of the result of a computation process executed at a specific timing on a specific one of said plurality of cores with the result of a computation process at a timing different from the specific timing, on another core different from the specific one of said plurality of cores, and determines that a failure occurs on the specific core when the comparison shows discontinuity in the computation process results.

2. The system according to claim 1, wherein the control system compares the results of the computation process in a continuous computation cycle.

3. The system according to claim 1, wherein the timing at which the control system is assigned to the plurality of cores to execute the computation process is determined in synchronism with an operation of the device.

4. A vehicle control system having a plurality of cores, for controlling a device mounted on a vehicle, said control system comprising:
- a computation process unit which executes a computation process, wherein said computation process is executed on the plurality of cores sequentially at specified timing using at least one continuously varying parameter obtained at each timing, and a result of said computation process is used to control the device; and
- a core failure determination unit that compares the result of a computation process executed by the computation process unit at a specific timing on a specific one of said plurality of cores, with the result of a computation process executed by the computation process unit at a timing different from the specific timing, on another core different from the specific one of said plurality of cores, and determines that a failure occurs on the specific core, based on a result of the comparison;
- wherein the core failure determination unit determines that a failure occurs on the specific core when there is a discontinuity in the results of the computation process in the computation process unit, due to switching of the core on which the computation process is executed in the computation process unit.

5. A vehicle control system having a plurality of cores, for controlling a device mounted on a vehicle, said control system comprising:
- a computation process unit which executes a computation process, wherein said computation process is executed on the plurality of cores sequentially at specified timing using at least one continuously varying parameter obtained at each timing, and a result of said computation process is used to control the device; and
- a core failure determination unit that compares the result of a computation process executed by the computation process unit at a specific timing on a specific one of said plurality of cores, with the result of a computation process executed by the computation process unit at a timing different from the specific timing, on another core different from the specific one of said plurality of cores, and determines that a failure occurs on the specific core, based on a result of the comparison;
- wherein:
- the vehicle control system includes a difference determination unit that calculates a difference in the results of the computation process performed by different cores and at different timings, to determine whether the difference is within a predetermined range; and
- the core failure determination unit determines that the failure occurs on the specific core based on a determination result of the difference determination unit.

6. The system according to claim 5, wherein the predetermined range for use in the determination in the difference determination unit is calculated in accordance with a moving average value of results in the execution of the at least two computation processes.

7. The system according to claim 5, wherein the core failure determination unit increments a failure counter when the determination result of the specific core in the difference determination unit is not within the predetermined range, to determine that the failure occurs on the specific core when the failure counter exceeds a predetermined number of times.

8. The system according to claim 5, wherein the difference determination unit is executed on a core determined to be normal by the core failure determination unit in the previous computation cycle.

9. The system according to claim 5, wherein the difference determination unit and the core failure determination unit execute redundantly on at least three odd-numbered cores to execute a core failure determination, in decision by a majority of the executed results.

10. The system according to claim 5, wherein the difference determination unit and the core failure determination unit execute redundantly on at least two cores to weight each of the determination results of the cores among the at least two cores and aggregate weighted results, so that the core failure determination is executed by using an aggregated result.

11. The system according to claim 5, wherein:
- the difference determination unit and the core failure determination unit execute redundantly on the at least three cores;
- when only one core among the at least three cores determines the specific core as a failure and the other cores among the at least three cores determine the specific core as a normal, the failure is judged that the failure occurs on the core which determines the specific core as the failure; and
- when the only one core among the at least three cores determines the specific core as normal and the other cores among the at least three cores determine the specific core as a failure, it is judged that the failure occurs on both the core which determines the specific core as the normal and the specific core.

12. A vehicle control system having a plurality of cores, for controlling a device mounted on a vehicle, said control system comprising:
- a computation process unit which executes a computation process, wherein said computation process is executed on the plurality of cores sequentially at specified timing using at least one continuously varying parameter obtained at each timing, and a result of said computation process is used to control the device; and
- a core failure determination unit that compares the result of a computation process executed by the computation process unit at a specific timing on a specific one of said plurality of cores, with the result of a computation process executed by the computation process unit at a timing different from the specific timing, on another core different from the specific one of said plurality of cores, and determines that a failure occurs on the specific core, based on a result of the comparison;
- wherein:
- the vehicle control system includes a difference determination unit that calculates a moving average value of results of at least two computation processes to calculate a difference between the moving average value and a result of the computation process at the specific timing, and determines whether the difference is within a predetermined range; and
- said difference determination unit determines that the failure occurs on the specific core based on the determination result of the difference determination unit.

13. A vehicle control system having a plurality of cores, for controlling a device mounted on a vehicle, said control system comprising:
- a computation process unit which executes a computation process, wherein said computation process is executed on the plurality of cores sequentially at specified timing using at least one continuously varying parameter obtained at each timing, and a result of said computation process is used to control the device; and a core failure determination unit that compares the result of a computation process executed by the computation process unit at a specific timing on a specific one of said plurality of cores, with the result of a computation process executed by the computation process unit at a timing different from the specific timing, on another core different from the specific one of said plurality of cores, and determines that a failure occurs on the specific core, based on a result of the comparison;

wherein:

the vehicle control multi-core system includes a computation process assignment unit to divide the computation process unit, such that it can be assigned to the plurality of cores in such a way that the core on which the computation process is executed at an execution timing is switched over; and the computation process assignment unit removes the specific core from an assignment target to reassign the computation process unit when the core failure determination unit determines that the failure occurs on the specific core.

14. A vehicle control system having a plurality of cores, for controlling a device mounted on a vehicle, said control system comprising:

a computation process unit which executes a computation process, wherein said computation process is executed on the plurality of cores sequentially at specified timing using at least one continuously varying parameter obtained at each timing, and a result of said computation process is used to control the device; and a core failure determination unit that compares the result of a computation process executed by the computation process unit at a specific timing on a specific one of said plurality of cores, with the result of a computation process executed by the computation process unit at a timing different from the specific timing, on another core different from the specific one of said plurality of cores, and determines that a failure occurs on the specific core, based on a result of the comparison;

wherein the core failure determination unit is executed on a core determined to be normal by the core failure determination unit at a previous computation cycle.

15. A vehicle control system having a plurality of cores, for controlling a device mounted on a vehicle, said control system comprising:

a computation process unit which executes a computation process, wherein said computation process is executed on the plurality of cores sequentially at specified timing using at least one continuously varying parameter obtained at each timing, and a result of said computation process is used to control the device; and a core failure determination unit that compares the result of a computation process executed by the computation process unit at a specific timing on a specific one of said plurality of cores, with the result of a computation process executed by the computation process unit at a timing different from the specific timing, on another core different from the specific one of said plurality of cores, and determines that a failure occurs on the specific core, based on a result of the comparison;

wherein:

the vehicle control system includes a drive mode switching-over unit for providing at least two drive modes for the vehicle; and the core failure determination is not executed for a predetermined time period when the drive mode is changed by the drive mode switching-over unit.

16. A vehicle control system having a plurality of cores, for controlling a device mounted on a vehicle, said control system comprising:

a computation process unit which executes a computation process, wherein said computation process is executed on the plurality of cores sequentially at specified timing using at least one continuously varying parameter obtained at each timing, and a result of said computation process is used to control the device; and a core failure determination unit that compares the result of a computation process executed by the computation process unit at a specific timing on a specific one of said plurality of cores, with the result of a computation process executed by the computation process unit at a timing different from the specific timing, on another core different from the specific one of said plurality of cores, and determines that a failure occurs on the specific core, based on a result of the comparison;

wherein:

the vehicle control system detects at least one input value for use in the computation process unit, and the core failure determination unit includes an input value difference determination unit that determines whether a difference between the input value at a specific input timing and the input value at an input timing earlier than the specific input timing is within a predetermined range with respect to the one or more input values; and the core failure determination is not executed for a predetermined time period when the input value difference determination unit determines that the difference is present outside the predetermined range.

17. The system according to claim 16, wherein the input value difference determination unit calculates the moving average value of the input values obtained from the at least two timings to determine whether a difference between the moving average value of the input values and the input value at the specific input timing is within the predetermined range.

18. The system according to claim 17, wherein the predetermined range for use in the determination in the input value difference determination unit is calculated in accordance with the moving average value of the input values.

19. An internal combustion engine controller having a plurality of cores to control an internal combustion engine, said controller comprising:

a computation process unit which executes a computation process, wherein said computation process is executed on the plurality of cores sequentially at specified timing using at least one continuously varying parameter obtained at each timing, and a result of said computation process is used to control the internal combustion engine; and a core failure determination unit that compares the result of a computation process executed by the computation process unit at a specific timing on a specific one of said plurality of cores, with the result of a computation process executed by the computation process unit at a timing different from the specific timing on another core different from the specific one of said plurality of cores, and determines that a failure occurs on the specific core, based on a result of the comparison;

wherein the core failure determination unit determines that a failure occurs on the specific core when there is a discontinuity in the results of the computation process in the computation process unit, due to switching of the core on which the computation process is executed in the computation processing unit.

\* \* \* \* \*